(12) United States Patent
Zboray et al.

(10) Patent No.: US 9,384,675 B2
(45) Date of Patent: Jul. 5, 2016

(54) SIMULATOR FOR SKILL-ORIENTED TRAINING

(75) Inventors: David Zboray, Trumbull, CT (US);
Matthew Bennett, Milford, CT (US);
Andy Lundell, New Britain, CT (US);
Jeremiah Hennessey, East Walpole, MA (US); Zach Lenker, Vernon, CT (US);
Matthew Wallace, South Windsor, CT (US); Jon Kallen, Norwich, CT (US);
Rebecca McKnight, Vernon, CT (US)

(73) Assignee: VRSIM, INC., East Hartford, CT (US)

( * ) Notice: Subject to any disclaimer, the term of this patent is extended or adjusted under 35 U.S.C. 154(b) by 770 days.

(21) Appl. No.: 13/639,697

(22) PCT Filed: Apr. 8, 2011

(86) PCT No.: PCT/US2011/000634
§ 371 (c)(1),
(2), (4) Date: Apr. 11, 2013

(87) PCT Pub. No.: WO2011/126571
PCT Pub. Date: Oct. 13, 2011

(65) Prior Publication Data
US 2013/0189656 A1    Jul. 25, 2013

Related U.S. Application Data

(60) Provisional application No. 61/322,045, filed on Apr. 8, 2010.

(51) Int. Cl.
*G09B 19/00* (2006.01)
*G06F 3/01* (2006.01)
*G09B 5/06* (2006.01)

(52) U.S. Cl.
CPC ............... *G09B 19/00* (2013.01); *G06F 3/011* (2013.01); *G06F 3/012* (2013.01); *G06F 3/014* (2013.01); *G09B 5/06* (2013.01)

(58) Field of Classification Search
CPC ................................. G09B 9/00; G09B 19/00
USPC ........................................................ 434/219
See application file for complete search history.

(56) References Cited

U.S. PATENT DOCUMENTS 6,368,111 B2    4/2002  Legarda
7,437,679 B2   10/2008  Uemura et al.
(Continued)

OTHER PUBLICATIONS

PCT Notification of Transmittal of the International Search Report and the Written Opinion of the International Searching Authority, or the Declaration for corresponding PCT Application No. PCT/US2011/000634; date of completion Jul. 19, 2011.
(Continued)

*Primary Examiner* — Michael Grant
(74) *Attorney, Agent, or Firm* — MKG LLC

(57) ABSTRACT

A simulator for skill-oriented training is presented. The simulator includes a platform having a sensor and provides an immersive virtual training environment. The simulator includes a display unit worn by the operator. The unit includes a camera, a speaker and a unit sensor. The camera and the speaker provide visual and audio output to the operator. The simulator includes a controller and a data processing system. The controller includes a sensor. The sensors cooperate to provide to the processing system signals representing spatial positioning, angular orientation and movement data of the controller relative to the platform and a work piece. In response, the processing system renders the work piece, a virtual coating spray pattern, a virtual coating as applied to the work piece and performance guidance in the training environment.

21 Claims, 20 Drawing Sheets

(56) References Cited

U.S. PATENT DOCUMENTS

| | | | |
|---|---|---|---|
| 7,839,416 B2 | 11/2010 | Ebensberger et al. | |
| 7,839,417 B2 | 11/2010 | Ebensberger et al. | |
| 2007/0209586 A1* | 9/2007 | Ebensberger et al. | 118/682 |
| 2008/0246693 A1* | 10/2008 | Hailpern et al. | 345/8 |
| 2009/0202975 A1 | 8/2009 | Bolick et al. | |
| 2009/0298024 A1* | 12/2009 | Batzler et al. | 434/234 |
| 2010/0062406 A1* | 3/2010 | Zboray et al. | 434/234 |

OTHER PUBLICATIONS

PCT Notification of Transmittal of International Preliminary Report on Patentability for corresponding PCT Application No. PCT/US2011/000634; date of completion Jun. 13, 2012.

* cited by examiner

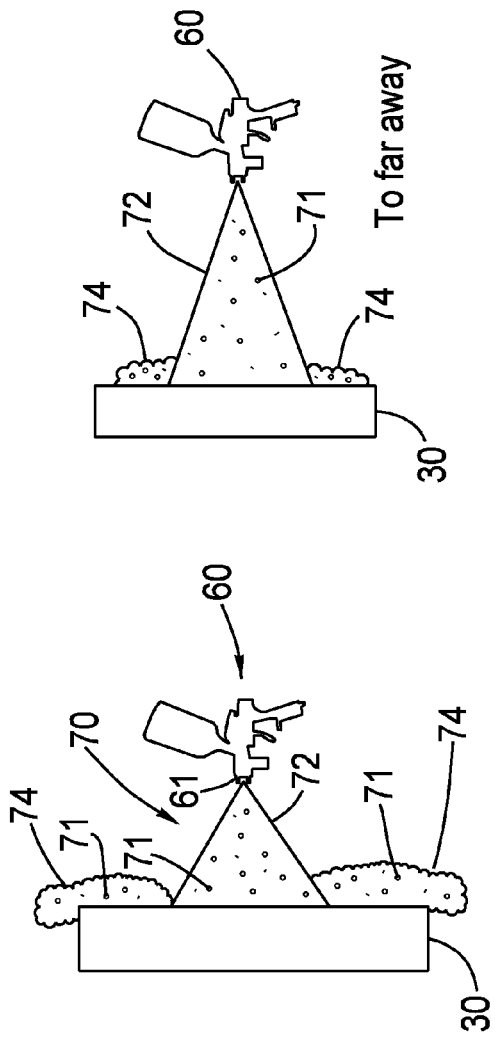
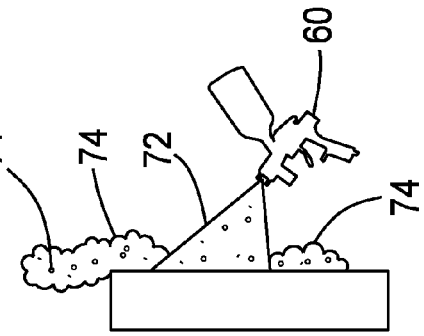
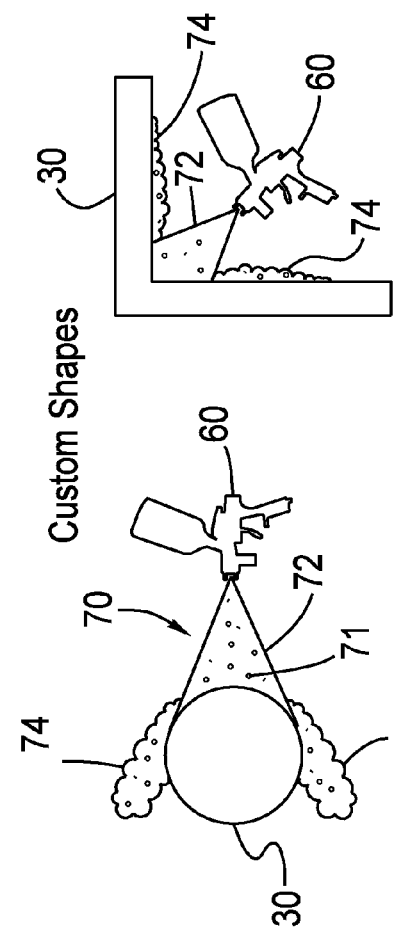
FIG. 2A
FIG. 2B  To far away
FIG. 2C  Custom Shapes
FIG. 2D
FIG. 2E  Bad angle

SIMULATOR FOR SKILL-ORIENTED TRAINING

COPYRIGHT NOTICE

A portion of the disclosure of this patent document contains material, which is subject to copyright protection. The copyright owner has no objection to the facsimile reproduction by anyone of the patent document or the patent disclosure, as it appears in the United States Patent and Trademark Office files or records, but otherwise reserves all copyright rights whatsoever.

BACKGROUND OF THE INVENTION

1. Technical Field

The present invention relates generally to a training system employing computer simulation and immersive virtual reality for instructing and evaluating the progress of a person performing a skilled-oriented task and, more particularly, to a simulator for instructing and evaluating performance of a skilled-oriented task of a process such as, for example, a component and/or assembly process performed by a tradesman.

2. Related Art

Generally speaking, training is needed for a person to acquire and/or maintain skills necessary for performing a skill-oriented task such as, for example, constructing, assembling and/or finishing one or more components. For example, when performing a coating or spraying step, an operator must operate a spray coating system at an optimum distance and orientation from a subject surface to be painted or coated so that a coating is applied at a proper finish coat thickness on the surface. If, for example, a nozzle of the spray coating system is placed too close to the subject surface, an uneven wet film build-up may result and/or the coating may run or drip. Alternatively, if the nozzle is placed too far from the subject surface, overspraying or ineffective coverage results such that repeated passes are required to achieve the desired finish coat thickness. Repetition and correction of less than optimal practices is needed to ensure personnel acquire and/or maintain the necessary skills. However, repetition is time consuming and costly as raw materials (e.g., surfaces to be coated, coatings and preparation materials, etc.) are expensive. Moreover, some coatings raise environmental concerns during use and/or disposal, which again can negatively impact training costs. Accordingly, training time and costs need to be optimized.

There have been efforts to simulate skill-oriented tasks such as spray coating operations to improve training and minimize costs. Some efforts have included the use of computer simulation and virtual reality; see, for example, U.S. Pat. Nos. 7,839,416 and 7,839,417, both issued on Nov. 23, 2010, and assigned at issuance to University of Northern Iowa Research Foundation (Cedar Falls, Iowa USA). However, these conventional systems are seen to be too expensive and/or lack the accuracy and "look and feel" of real life task and, spray coating operations in particular. As such, conventional simulation systems are of limited use within, and of limited benefit to the industry.

Accordingly, there is a need for improved training systems and method using computer simulation and immersive virtual reality and which permit evaluation of the progress of a person applying a coating using a spray coating system.

SUMMARY OF THE INVENTION

The present invention is directed to a simulator for skill-oriented training of a task. The simulator includes a work piece platform having at least one platform sensor and a three-dimensional immersive virtual training environment depicting a work piece rendered on the work piece platform. The simulator also includes a head-mounted display unit (HMDU) worn by an operator operating the simulator. The HMDU includes at least one camera, at least one speaker and at least one HMDU sensor. The camera and the speaker provide visual and audio output to the operator thus depicting the training environment. The simulator also includes a controller. The controller includes at least one controller sensor. The controller sensor, the HMDU sensor and the platform sensor cooperate to output one or more signals representing spatial positioning, angular orientation and movement data of the controller relative to the work piece platform. The simulator includes a data processing system coupled to the work piece platform, the HMDU, and the controller. The data processing system receives the one or more signals and executes a plurality of algorithms for rendering in real-time the work piece, a virtual coating spray pattern, a virtual coating as applied to the work piece and sensory guidance as to performance to the person in the training environment. The algorithms include a tracking engine, a physics engine and a rendering engine. The tracking engine receives the one or more signals from the controller sensor, the HMDU sensor and the platform sensor, and determines coordinates of a next position, next orientation, and a speed of movement of the controller in relation to the work piece and the work piece platform from a previous position and a previous orientation to the next position and the next orientation. The physics engine models a spray coating process and determines the virtual coating spray pattern and the applied virtual coating from the coordinates within the training environment. The rendering engine receives the modeled spray coat process and, in response thereto, renders the virtual coating spray pattern and the applied virtual coating in the training environment. The simulator operates such that the virtual coating spray pattern, the applied virtual coating and the sensory guidance are exhibited in near real-time to the operator within the training environment to provide in-process correction and reinforcement of preferred performance characteristics as the operator operates the controller.

In one embodiment, the sensory guidance exhibited to the operator includes one or more of visual, audio and tactile indications of performance. In one embodiment, the applied virtual coating is depicted to include a plurality of coverage regions and the visual indications include one or more icons highlighting one or more of the plurality of coverage regions having less than optimal characteristics. In one embodiment, the one or more icons include a Too Close indication icon, a Too Far indication icon, a Bad Angle indication icon and a Too Fast indication icon. In one embodiment, lines depict one or more paths the controller takes in applying the coating.

In yet another embodiment, the audio indications of performance include an audio tone output by the at least one speaker of the HMDU. In one embodiment, the audio tone increases in volume or repeated pattern as the controller is positioned too close to the work piece. In one embodiment, the audio tone decreases in volume or repeated pattern as the controller is positioned too far from the work piece.

In yet another embodiment, the simulator includes a display device operatively coupled to the data processing system such that an instructor may monitor the performance of the person operating the controller.

In still another embodiment of the simulator, the controller further includes one or more haptic devices that impart at least one of forces, vibrations and motion to the person operating the controller.

BRIEF DESCRIPTION OF THE DRAWINGS

Referring now to the Figures, which are exemplary embodiments, and wherein the like elements are numbered alike.

FIG. 2 depicts characteristics of a virtual spray coating emitted by the coating simulator of FIG. 1, according to one embodiment of the present invention.

DESCRIPTION OF PREFERRED EMBODIMENTS OF THE INVENTION

Figure 1:
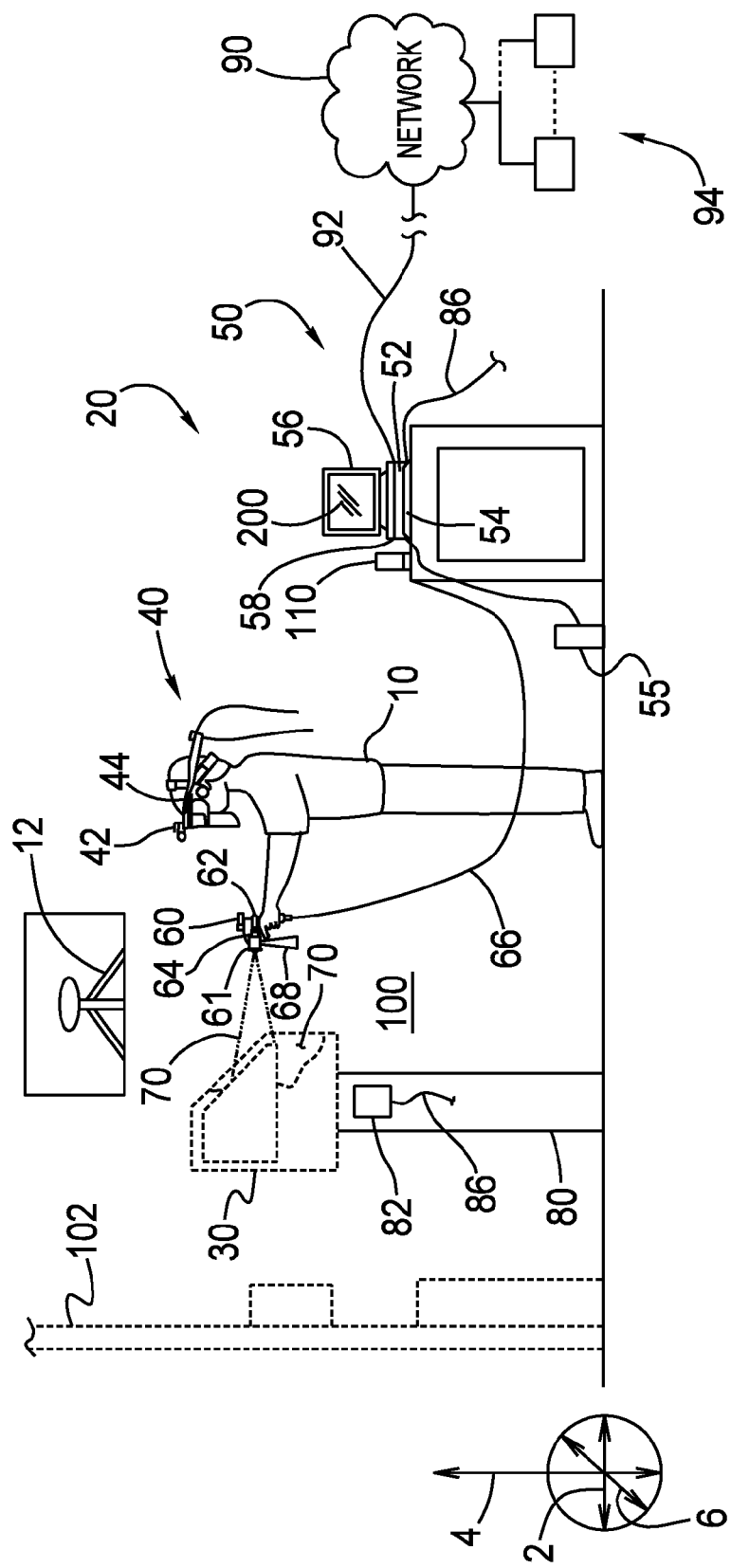
FIG. 1 is a schematic diagram of a coating simulator defining and operating within a three-dimensional spray coating environment, according to one embodiment of the present invention.

FIG. 1 depicts an operator 10 operating a simulator 20 for training, for example, to develop and/or improve his/her skills in performing a skill-oriented task or step within a process. The simulator 20 provides an evaluation of the skills demonstrated by the operator 10 in performing the skill-oriented task or step. The operator's skills include, for example, proper technique in performing the task, namely, his/her positioning and movement of a tool to consistently perform the task in a preferred manner. As described herein, the simulator 20 provides evaluation in real-time, e.g., as the task or step is being performed, and after one or more performances, e.g., in one or more review modes. In one embodiment, the simulator 20 is a coating simulator for training and evaluating the operator's performance of a task, namely, using a controller 60 (e.g., a spray controller) to apply one or more coatings to a work piece 30. A tracking system spatial senses and tracks movement of the controller 60 (e.g., speed, direction or path, orientation, and the like) by the operator 10 in one or more applications of the coating. The simulator 20 collects, determines and/or stores data and information defining the movement of the controller 60 including its speed, direction or path, orientation, and the like, in the one or more applications of the coating (e.g., passes applying the coating). The simulator 20 simulates, in virtual reality, a virtual coating 70 emitted from a nozzle 61 of the controller 60 in response to activation or depression of a trigger 63 of the controller 60 by the operator 10. The coating 70 is rendered to include size, shape, color including both coating color and a "wet look" effect (e.g., reflectivity and gloss), depth, viscosity, angular sheen, texture and like characteristics, as it is applied in real-time to the work piece 30. The movement of the controller 60 and the characteristics of the applied coating 70 are evaluated, in process and after application, such that the operator 10, an instructor and/or others (e.g., other trainees) may evaluate the technique used in applying the virtual coating 70, make in-process adjustments to or maintain the technique being performed and/or performed in a next application. The evaluation compares the demonstrated technique to acceptable performance criteria for the task.

It should be appreciated that, as described herein, the simulator 20 can be used for training, developing and improving other skills (e.g., more than just applying a coating) required in skill-oriented tasks performed by tradesman. It should also be appreciated that the simulator 20 may be implemented as a project based system wherein an individual instructor, certification agent, or the like, may define their own performance characteristics (e.g., elapsed time, desired coating thickness, and the like) and/or criteria including those unique to the instructor, agent and a given coating or application, and/or which incorporate industry performance criteria, standards and/or inspection protocols.

As shown in FIG. 1, the coating simulator 20 employs immersive virtual reality to create a three-dimensional (3-D) spray coating environment 100. The 3-D spray coating environment 100 presents near real-time 3-D virtual imagery of the work piece 30 aligned with the operator 10 and the coating simulator 20 as the coating 70 is being applied to the work piece 30. As described below, the 3-D spray coating environment 100 depicts an area of interest 102 such as, for example, a spray booth, production or manufacturing shop floor, and the like, to provide the operator 10 with a "look-and-feel" of performing the coating task under typical working conditions. As shown in FIG. 1, the work piece 30 is rendered upon a work piece platform 80 within the coating environment 100. In one embodiment, the platform 80 may be adjustable in a plurality of positions, for example, within any of three (3) directions including over a x-axis 2 defined in a horizontal plane toward and/or away from the operator 10, a y-axis 4 defined by a vertical plane, and a z-axis 6 defined by a plane projecting to a right-hand side of the operator 10 (e.g., inwardly on FIG. 1) and a left-hand side of the operator 10 (e.g., outwardly from FIG. 1).

In one aspect of the present invention, the inventors have discovered that an accurate simulation of spray effects occurring during application of a coating accounts for component parts of the spray coating and characteristics of the application process. That is, a conventional spray gun emits a liquid-gas mixture from its nozzle typically including the coating (e.g., a paint, stain, epoxy and other coatings) and compressed air or other gas. The simulator 20 renders the mixture as a fine spray of particles 71. Accordingly, and as shown in FIGS. 2A-2E, the coating simulator 20 as described herein implements the virtual coating 70 as particles 71 comprising a spray cone 72 and a spray cloud 74. The spray cone 72 including the particles 71 that collide with, adhere to and/or accumulate on a surface of the work piece 30. The spray cloud 74 includes the particles from the spray cone 72 that "bounce back" from the surface of the work piece 30 (FIG. 2A). In one embodiment, the size and/or shape of the spray cloud 74 is a visual indication of poor transfer efficiency of the coating 70 to the work piece 30 and its accurate simulation, along with accumulation on (e.g., coverage of) the work piece 30, can assist in the correction of in-process technique and thus is a valuable training aid. As shown in FIGS. 2B-2E, characteristics of the spray cone 72 and the spray cloud 74 varying within the simulator 20 depending on, for example, the proximity or distance between the controller 60 emitting the coating 70 from its nozzle 61 and the work piece 30 (FIGS. 2A and 2B), the shape and/or size of the work piece 30 (FIGS. 2C and 2D), the orientation or angle of the controller 60 relative to the work piece 30 (FIG. 2E) and other characteristics of the spray operation (e.g., direction and/or speed of a coating pass), condition of the work piece 30 (e.g., whether it is dry or wet, overlap, etc.) and/or environmental conditions such as, for example, rendered/simulated environmental effects such as temperature, wind, moisture and the like.

Moreover, the coating simulator 20 simulates characteristics of the spray cone 72 and the spray cloud 74 in what are referred to as "air" effects and "applied" or "on" effects to provide an even more realistic rendering of the virtual coating 70. As should be appreciated, the air effects include characteristics of the coating particles 71 as they travel through the simulated air such as, for example, size, shape, color, texture, and the like, as particles move at varying speeds influenced by, for example, pressure settings, trigger position, and the like, of the controller 60. The applied or on effects include characteristics of the coating particles 71 as they exist on the work piece 30 such as, for example, color (e.g., coating color and wet look), shape, depth, viscosity, angular sheen, texture, overlap, and defects in coverage (e.g., crackling, drips, etc.) and the like. As should be appreciated, it is within the scope of the present invention to monitor a time period for one or more of these characteristics such that as the coating particles 71 remain on the work piece 30 for a predetermined duration of time characteristics such as, for example, the wet look (reflectivity and/or gloss), the simulator 20 may gradually change the particles 71 to simulate drying and/or fading. Similarly, when applying a coating for a second and/or subsequent pass, a "wet" work piece 30 influences how new particles 71 are applied and/or are retained on (e.g., accumulate on) the work piece 30. For example, in one embodiment, the coating simulator 20 accounts for such characteristics by merging one or more wet particles within a predetermined distance from each other to influence the wet look or formation of drips and/or runs on the work piece 30 due to excessive accumulation and build-up. Aspects of the simulation of such defects are described in further detail below.

Figure 3:
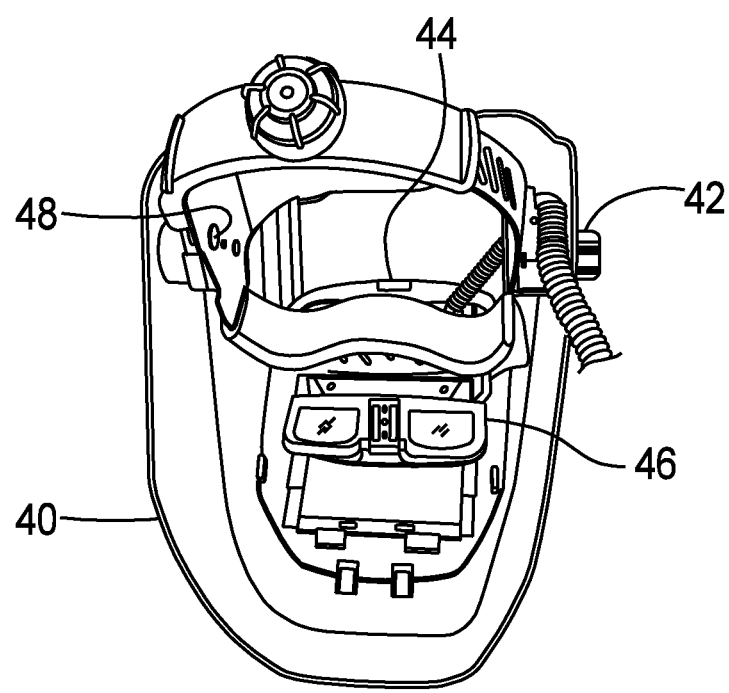
FIG. 3 depicts a head-mounted display unit utilized in the coating simulator of FIG. 1, according to one embodiment of the present invention.

Referring to FIGS. 1 and 3, one or more video cameras 42 and other sensors 44 provided on, for example, a head-mounted display unit (HMDU) 40 worn by the operator 10, provide data to a processing system 50 which reconstructs a position and orientation of the HMDU 40 and the controller 60 in relation to the platform 80 and the work piece 30 in the coating environment 100. As the controller 60 is operated by the operator 10, the processing system 50 generates virtual imagery of the controller 60 applying the virtual coating 70 to the work piece 30. The operator 10 interacts within the virtual reality provided in the 3-D spray coating environment 100, for example, to view and otherwise sense (e.g., see, feel and hear) the work piece 30, the controller 60 and the coating 70 as it is being applied. The interaction is monitored and data therefrom is recorded to permit performance evaluation by the operator 10, an instructor or certification agent 12 and/or other operators/trainees present during training or otherwise monitoring the interaction within the coating environment 100 at or from another location remote from where the training is being conducted, as is described in further detail below.

In one embodiment, the coating simulator 20 generates audio, visual and other forms of sensory output, for example, vibration, air flow, workplace disturbance (e.g., wind, noise, etc.), environmental conditions (e.g., lighting) and the like, to simulate senses experienced by the operator 10 as if the operation is being performed in a real world setting. For example, the coating simulator 20 simulates experiences that the operator 10 may encounter when performing the coating task "in the field," e.g., outside of the training environment. As shown in FIG. 3, the HMDU 40 includes a display device 46 and audio speakers 48 that provide images and sounds generated by the coating simulator 20 to the operator 10. In keeping with the goal of accurately simulating real world settings and work experiences within the 3-D spray coating environment 100, the spray controller 60 of the coating simulator 20 emulates characteristics of an actual spray gun and the sound and feel (e.g., weight, vibration and the like) of operating the same. For example, the controller 60 is similar in configuration as, for example, a conventional spray gun, an airless spray gun, an air powered spray gun, a powder coat applicator, an HVLP (high-volume low-pressure) spray gun, air-assisted airless gun, and the like models available for purchase by those in the industry, including being substantially the same in terms of shape, weight and operating features and functions. In one embodiment, a weight of a tank or cylinder 68 of the controller 60 (FIGS. 1, and 15A-15D) that would include coating to be applied, is selectively adjusted (e.g., weight is reduced) to simulate consumption of the coating based on a duration of the spraying operations. In some embodiments, the simulated coating 70 may comprise a dry powder or liquid such as, for example, a paint, stain, epoxy and other coatings. Input and output devices of the HMDU 40 and the spray controller 60 such as, for example, the cameras 42, the sensors 44, the display 46, and the speakers 48 of the HMDU 40, and sensors 62 and haptic devices 64 that impart forces, vibrations and/or motion (e.g., of the controller 60, pressure from the mixture (coating and air) emitted from the controller, and the like) to the operator 10 (e.g., rumble packs) of the controller 60, and external input and output devices such as speakers 55, are incorporated into the conventional form factors. Moreover, control knobs, buttons and the like, that are used to set coating parameters of the spray gun, compressor and like peripheral equipment, are simulated on the spray controller 60 and/or the data processing system 50. Signals from these input and output devices (as described below) are input signals and provide data to the processing system 50. The data is processed and provided to permit a thorough evaluation of the simulated coating procedure including the settings of equipment used therein.

As should be appreciated, the HMDU 40, the spray controller 60 and the work piece platform 80 provide a plurality of inputs to the coating simulator 20. The plurality of inputs includes, for example, spatial positioning (e.g., proximity or distance), orientation (e.g., angular relationship) and movement (e.g., direction and/or speed) data and information for tracking the position of the spray controller 60 relative to the work piece 30 and/or work piece platform 80 within the 3-D spray coating environment 100. The HMDU 40, the spray controller 60 and/or the work piece platform 80 may include sensors that track the movement of the operator 10 operating the controller 60. In one embodiment, sensors 62 and 82 such as, for example, magnetic sensors, are mounted to and/or within the spray controller 60 and the work piece platform 80 for measuring spatial position, angular orientation and movement within the 3-D spray coating environment 100. In one embodiment, the sensors 62 and 82 of the controller 60 and the platform 80 are components of a six degree of freedom (e.g., x, y, z for linear direction, and pitch, yaw, and roll for angular direction) tracking system 110 such as, for example, is available as a Polhemus PATRIOT™ Tracking System, model number 4A0520-01, from the Polhemus company (Colchester, Vt. USA) operatively coupled to the processing system 50. It should be appreciated that it is within the scope of the present invention to employ other tracking systems for locating the controller 60 in relation to the platform 80 and the work piece 30. For example, in some embodiments the coating simulator 20 includes a capability to automatically sense dynamic spatial properties (e.g., positions, orientations, and movements) of the spray controller 60 during a virtual coating process that produces a virtual coating. The coating simulator 20 further includes the capability to automatically track the sensed dynamic spatial properties of the spray controller 60 over time and automatically capture (e.g., electronically capture) the tracked dynamic spatial properties of the spray controller 60 during the virtual coating process.

As shown in FIG. 1, the sensors 62 and 82 output data that is received by the tracking system 110 over communication connections 66 and 86 (e.g., provide input) and provided to the processing device 50 for use in determining the operator's 10 and the spray controller's 60 movement within the 3-D spray coating environment 100, e.g., in relation to the work piece 30 and platform 80. While shown as wired communication connections, it should be appreciated that the communication connections 66 and 86 may be or may include wireless communication connections. As noted above, FIGS. 15A-15C depict embodiments of the controller 60. Each of the controllers 60 includes a nozzle 61 emitting the virtual coating 70, and a trigger 63 depressed by the operator 10 into one or more positions that selectively regulate a flow of the coating 70 from the nozzle 61.

In one embodiment, the processing system 50 is a standalone or networked computing device 52 having one or more microprocessors, memory (e.g., ROM, RAM), and/or data storage devices 140 (e.g., hard drives, optical storage devices, and the like) as is known in the art. The computing device 52 includes an input device 54 such as, for example, a keyboard, mouse or like pointing device, touch screen portions of a display device, ports 58 for receiving data such as, for example, a plug or terminal receiving the wired communication connections 66 and 86 from the sensors 62 and 82 directly or from the tracking system 110, and an output device 56 such as, for example, one or more display devices operative coupled to the computing device 52 such as a monitor coupled directly to the computing device or portable device such as a personal digital assistant (PDA), IPAD or the like. In one embodiment, the output devices 46 and 56 exhibit one or more graphical user interfaces 200 (as described below) that may be viewed by the operator 10 operating the coating simulator 20, the instructor or certification agent 12, and/or other interested persons such as, for example, other trainees, observing and evaluating the operator's 10 performance. In one embodiment, the processing system 50 includes network communication circuitry 57 for operatively coupling the processing system 50 by wired or wireless communication connections 92 to a network 90 such as, for example, an intranet, extranet or the Internet, and to other processing systems, display devices and/or data storage devices 94. In one embodiment, described in detail below, the communication connection 92 and the network 90 provide an ability to share performance and ratings (e.g., scores, rewards and the like) between and among a plurality of operators (e.g., classes or teams of trainees) via such mechanisms as electronic mail, electronic bulletin boards, social networking sites, and the like.

Figure 4:
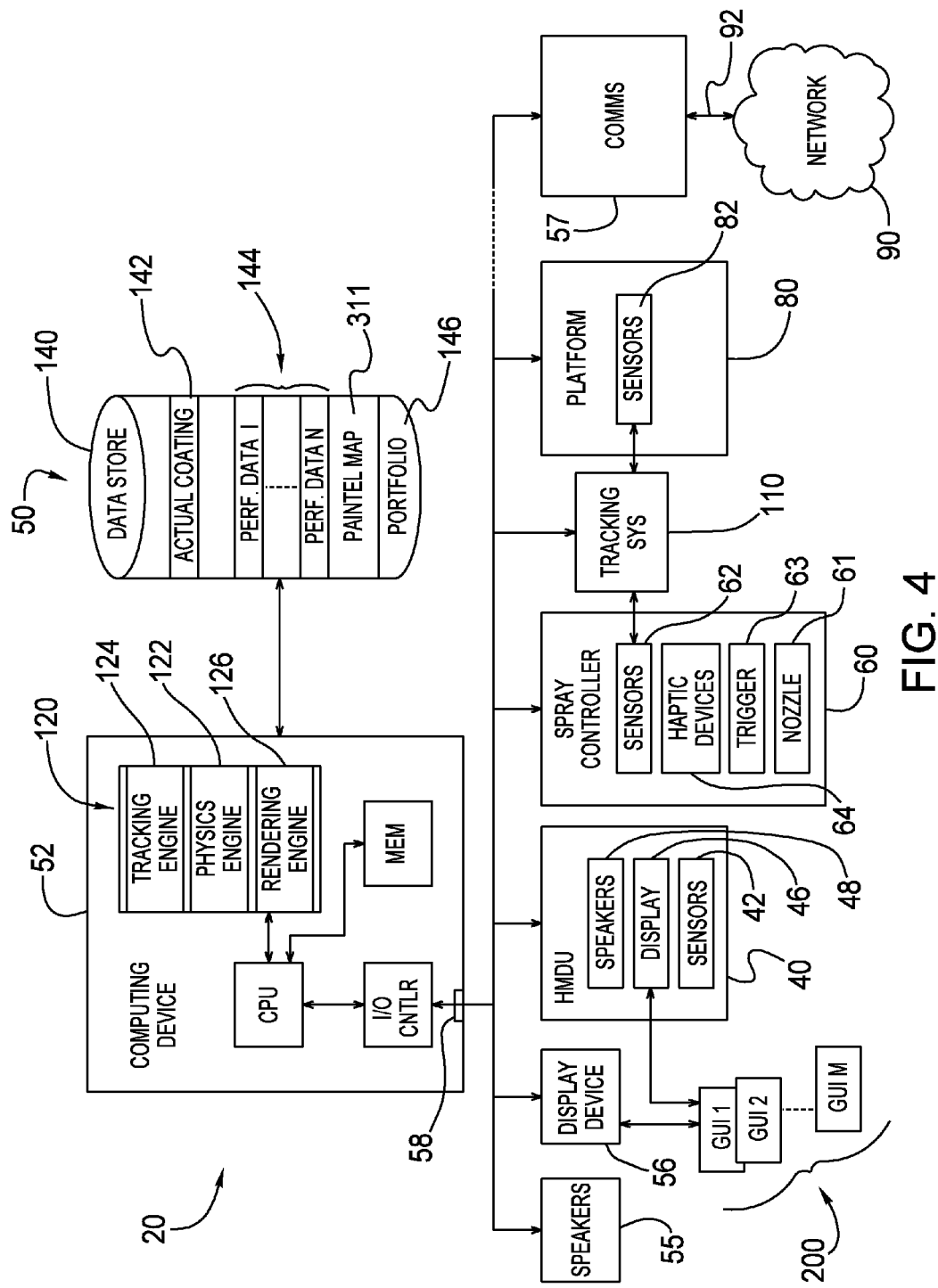
FIG. 4 is a simplified block diagram of components of the coating simulator of FIG. 1, according to one embodiment of the present invention.

As shown in FIG. 4, a simplified block diagram view of the coating simulator 20, the computing device 52 of the processing system 50 invokes one or more algorithms or subsystems 120 programmed and executing within, or hosted at a remote location and cooperating with, the computing device 52 to generate and provide the 3-D spray coating environment 100. The subsystems 120 include, for example, a physics engine 122, a tracking engine 124, and a rendering engine 126. The physics engine 122 models an actual spray coating process and outputs a virtual spray pattern (e.g., the virtual coating 70 including the spray cone 72 and spray cloud 74) that is rendered on and near the work piece 30. The tracking engine 124 receives input and data from the coating environment 100 such as a spatial position (e.g., proximity and distance) and/or an angular orientation of the spray controller 60 from the work piece 30, as well as a direction, path and/or speed of movement of the spray controller 60 in relation to the work piece 30 and the work piece platform 80 as provided by the sensors 62 and 82. The tracking engine 124 processes the input and data and provides coordinates to the physics engine 122. The physics engine 122 models a spray coating application based on the received input, data and coordinates, to determine virtual coating spray pattern information. The physics engine 122 provides the determined virtual coating spray pattern information to the rendering engine 126 such that a virtual coating spray pattern (e.g., the virtual coating 70) is rendered in the 3-D spray coating environment 100. It should be appreciated that one or more of the subsystems 120 described herein (e.g., the physics engine 122, the tracking engine 124 and the rendering engine 126) may access a data store 140 including data describing an actual spray coating process 142, previous virtual spray patterns, scores and performance criterion 144 for one or more trainee/operators (e.g., the operator 10), and like coating simulation data as well as variables and/or parameters used by the coating simulator 20. It should be appreciated that the input and data is processed by the computing device 52 in near real-time such that the position, distance, orientation, direction and speed of movement of the spray controller 60 and path of the virtual spray coating 70 directed therefrom is depicted on the work piece 30 as the operator 10 is performing one or more passes of a coating operation. That is, characteristics of the path (e.g., speed, direction, overspray and/or underspray, and the like) are depicted on or near the work piece 30 as if the virtual coating 70 is actually being applied by the operator 10 operating the coating simulator 20. Further aspects of the coating simulator 20 and its presentation of coating coverage and controller paths, are described in detail below.

It also should be appreciated that the input data includes one or more parameters set by the operator 10 on the spray controller 60 and/or entered via the display device 56 simulating coating process setting such as, for example, a compressor setting of air pressure, flow rate of the coating and other spray coating process parameters, as are known in the art. Moreover, the operator 10 may enter parameters indicating a type or brand of spray controller 60 that is being modeled. Entering a type or brand of a spray controller 60 may indicate specific parameters to the processing system 50 that are unique to a type or brand of spray controller. In some embodiments, the operator 10 may also enter environmental data such as, but not limited to, wind conditions, humidity, temperature, and/or an amount of sunlight or shade that are simulated within the 3-D spray coating environment 100. In effect, the physics engine 122, tracking engine 124 and rendering engine 126 simulate coverage of the work piece 30 by a selected coating in a non-virtual environment. The coating simulator 20 ensures accuracy of its simulation by depicting and selectively exhibiting one or more characteristics of the spray path including the region of coverage, whether coverage is on or off the work piece 30 (e.g., the spray cone 72 and spray cloud 74) and the like. In one embodiment, variations within the coverage pattern, for example, areas of below target, target and over target buildup (e.g., finish coat thickness) are depicted in one of differing colors or are identified by icons or other visual indicators on the work piece 30 during virtual application and/or subsequent thereto such as, for example, in one or more review or evaluation modes, a specific instructional mode and/or a playback mode, where one or more coating procedures are shown to the operator 10 (e.g., trainee), the instructor or certification agent 12, and/or other trainees.

Figure 13:
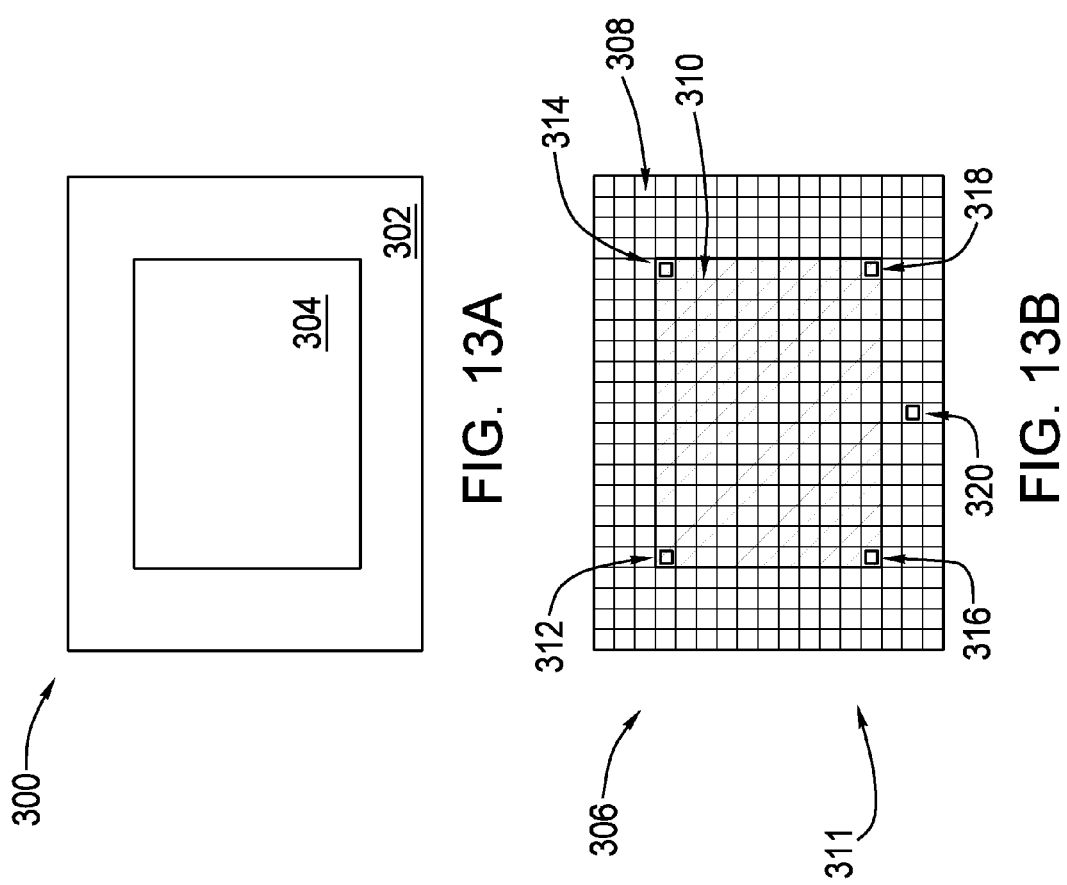
FIGS. 13A and 13B depict modeling of a virtual coating spray pattern employing a PAINTEL displacement map, according to one embodiment of the present invention.

In some embodiments, referring to FIGS. 13A and 13B, a plurality of PAINTELs (e.g., a pixel for a paint and/or coating application) may be employed to model a virtual coating spray pattern and/or defects in the coating on a surface, where the PAINTELs are based on a displacement map. PAINTELs may be used to facilitate modeling of a coating pattern and defects that are associated with an application of the coating, such as, but not limited to, orange peel effects, pooling, drips or runs, tiger striping, or like defects. For example, FIG. 13A illustrates a surface of an object 300 to be coated that includes a first area 302 and a second area 304. The first area 302 and the second area 304 may comprise different materials, surface textures, or the like. For example, the first area 302 may comprise a metal frame and the second area 302 may comprise glass. As shown in FIG. 13B, a virtual object 306 may comprise a virtual representation of the surface of the object 300 to be coated. Like the object to be coated 300, the virtual object 306 includes a first virtual area 308 and a second virtual area 310. The virtual object 306 may be represented by a grid or array of PAINTELs in a form of a PAINTEL map 311. Each PAINTEL 312, 314, 316, and 318 defines a portion of the virtual surface of the virtual object 306 and, as such, represents a portion of the surface of the object 300 to be coated. The PAINTEL map 311 defines the surface resolution as well as defines borders between different areas 308 and 310. Changeable parameter values are assigned to each PAINTEL, allowing values of each PAINTEL to dynamically change in real-time during a simulated coating process and allowing the operator 10 to adjust or maintain the application of the virtual coating pattern and thus, learn to apply the coating correctly. In some embodiments, the changeable parameter values correspond to, but are not limited to, color (coating color and/or wet look), shape, depth, viscosity, temperature, angular sheen, texture and/or like characteristics, which allow the PAINTELs 312, 314, 316 and 318 and the PAINTEL map 311 to model and graphically illustrate the virtual spray coating pattern and/or any defects therein. As illustrated in FIGS. 13A and 13B, PAINTELs 312, 314, 316, and 318 may further indicate a boundary between the first virtual area 308 and the second virtual area 310. For example, if the user 10 is assigned to paint only the first virtual area 308, any overspray onto the second virtual area 310 can be indicated by PAINTELs within the area defined by PAINTELs 312, 314, 316, and 318.

Figure 12:
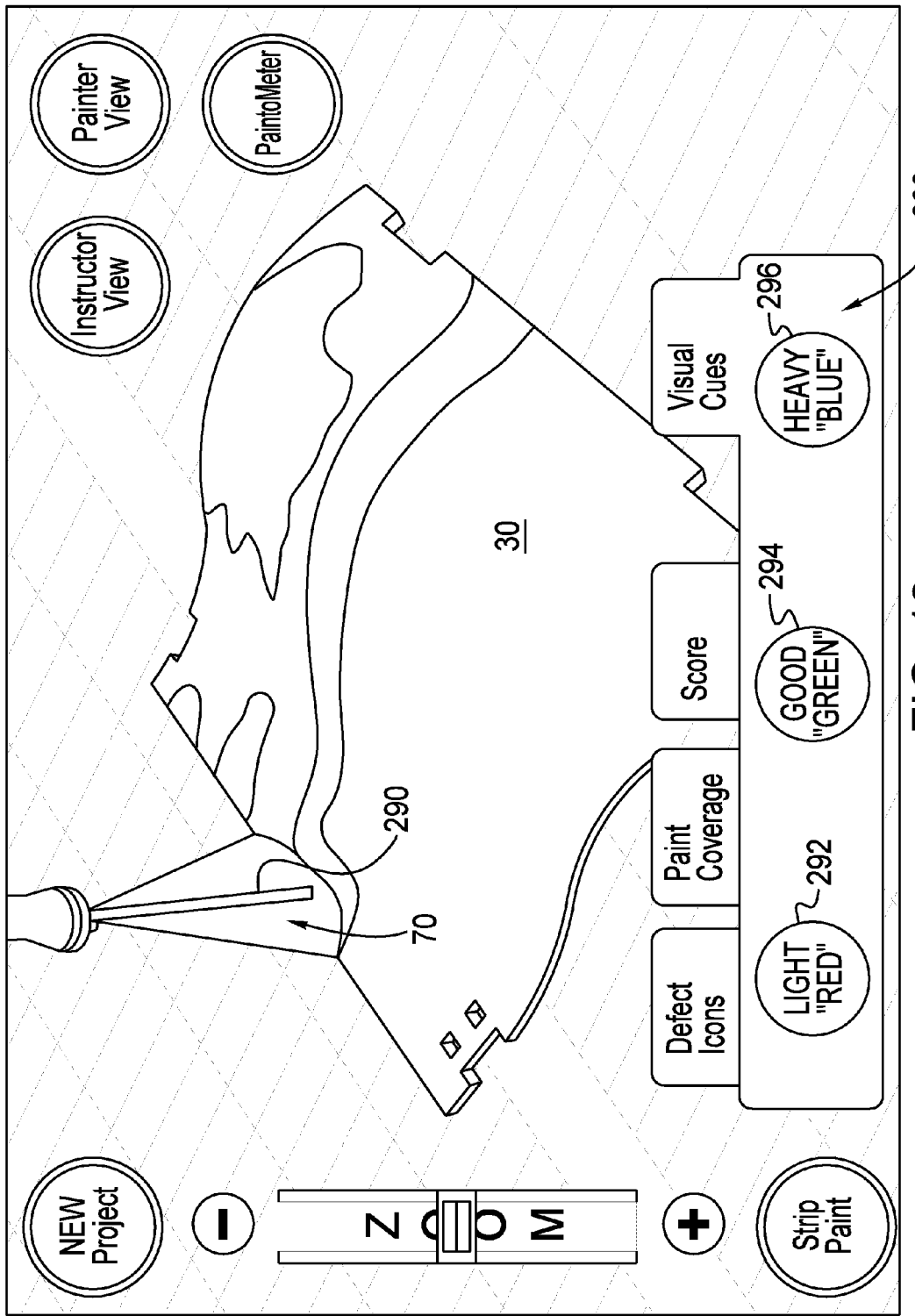

In one aspect of the invention, the coating simulator 20 enhances the sensory feedback provided to the operator 10 by the HMDU 40 and the controller 60 (e.g., the sensors 44 and 62, the display 46 and the haptic devices 64) by providing other sensory cues (e.g., visual, audio and/or tactile cues) as teaching aids and tools to reinforce preferred techniques as an application of the coating 70 is in-process (e.g., while performing a pass) and later during one or more evaluation or review modes. In one embodiment, a visual cue includes a distance gauge 290 (FIG. 12) that changes color within the coating 70, e.g., from a first color 292 (e.g., a red color) to a second color 294 (e.g., a green color) as the operator 10 moves the spray controller 60 from a position/distance that is too far (e.g., red color position) from the work piece 30 to a more optimal position from the work piece 30 (e.g., green color position) and from the second color 294 either back to the first color 292 or to a third color 296 (e.g., a blue color) as the spray controller 60 is moved too close to the work piece 30. It should be appreciated that the distance gauge 290 is not equivalent to merely recording and outputting distance readings in a report or during the evaluation mode, which the simulator 20 may also do. Rather, the sensory cues are provided to the operator 10 as he/she operates the coating simulator 20 during a coating process such that the operator 10 may adjust, for example, the angle, distance, and/or speed of the spray controller 60 in relation to the work piece 30 and/or the work piece platform 80 during an on-going coating process (e.g., coating pass). Moreover, while a visual display of color is described above as providing an indication of performance characteristics, it should be appreciated that other sensory cues may be used such as, for example, an audio tone (e.g., output by the speakers 48 of the HMDU 40 and/or external speakers 55) that may increase in volume or a repeated pattern as the controller 60 is positioned too close to the work piece 30 and/or decrease in volume or repeated pattern as the controller 60 is position too far from the work piece 30.

Figure 14:
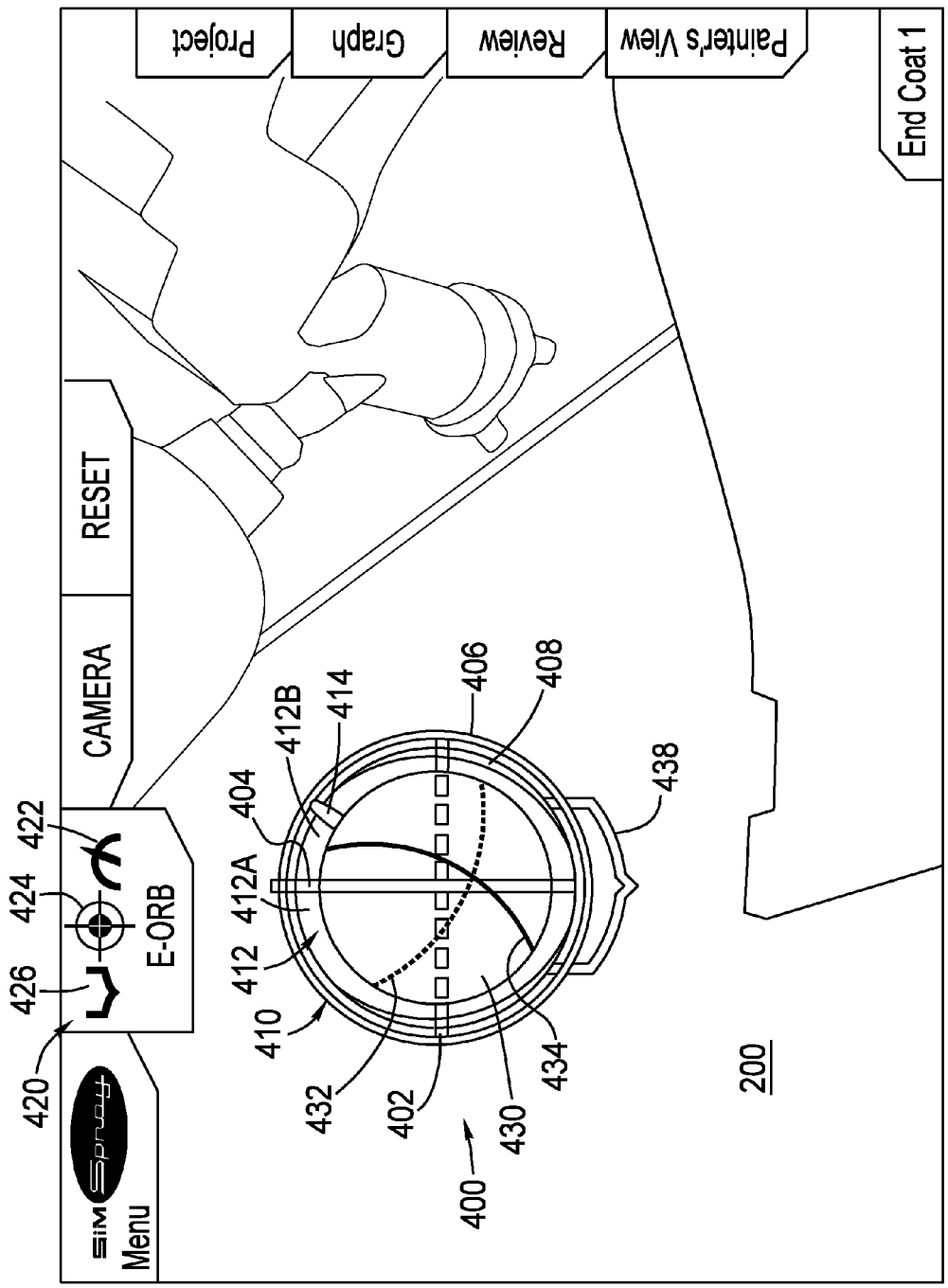
FIG. 14 is exemplary graphical user interface depicting a visual cue for indicating characteristics of an application of a coating with the coating simulator of FIG. 1, according to one embodiment of the present invention.
Figure 15B:
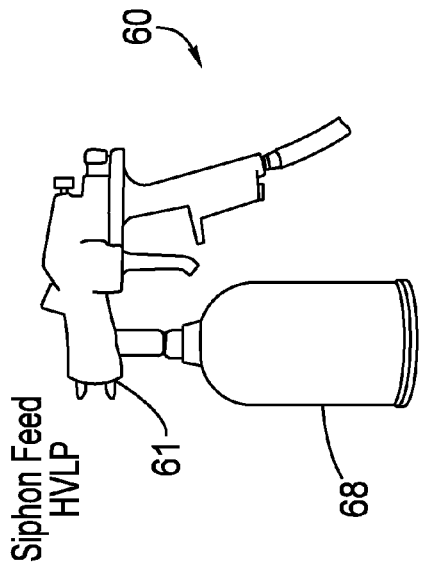
FIGS. 15A to 15C depicts a spray controller utilized in the coating simulator of FIG. 1, according to one or more embodiments of the present invention.
Figure 15C:
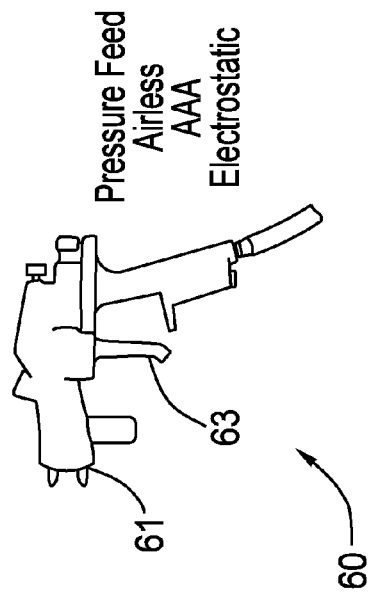
Figure 15A:
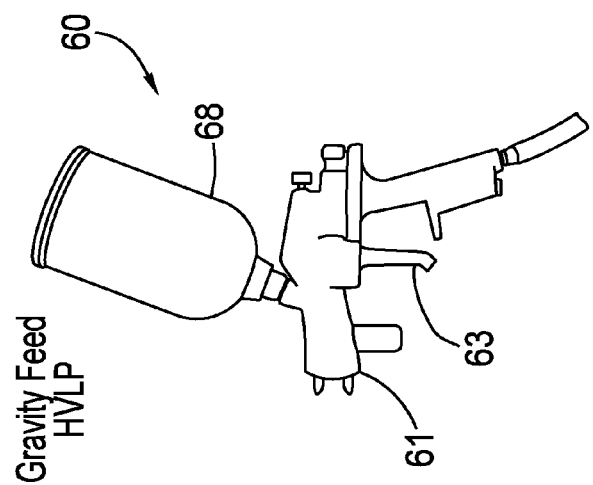

In one embodiment, a visual cue includes an emulation orb or sphere 400 (e.g., E-Orb 400) (FIG. 14) that provides a plurality of visual cues to aid the operator 10 in forming and maintaining proper coating techniques during a coating pass by visually relating current movement of the controller 60 (e.g., speed, direction or path, orientation, distance, and the like) to preferred or "guideline" movement. For example, as shown in FIG. 14, the E-Orb 400 includes three components to visually illustrate movement, as separately identified in a reference frame 420 on a graphical user interface 200, of speed of a coating pass 422, angle or orientation 424 of the controller 60 relative to the work piece 30, and distance or proximity 426 of the controller 60 to the work piece 30. The E-Orb 400 compares and presents, in real-time, the sensed, tracked and/or determined performance characteristics of speed, angle and distance, to preferred or ideal performance characteristics of speed, angle and distance for a given coating, work piece and/or other predefined criteria. In one embodiment, illustrated in FIG. 14, the E-Orb 400 includes a horizontal bar or axis 402 and a vertical bar or axis 404 appearing, for example, as "cross-hairs" or a sight used in "targeting." The E-Orb 400 includes an outer ring 406 and an inner ring 408. The bars 402 and 404 and the rings 406 and 408 of the E-Orb 400 represent the preferred or guideline values for movement of the controller 60 against which the sensed, tracked and/or determined movement characteristics are compared.

As shown in FIG. 14, the E-Orb 400 includes a mock speedometer 410 to visualize the speed 422 as which the controller 60 is being operated during a coating pass. The speedometer 410 includes an upper arc 412 and a needle 414. The upper arc 412 is divided into two portions representing various values of speed. A first or left portion 412A extends from the horizontal bar 402 upwardly to the vertical bar 404. A second or right portion 412B extends from the vertical bar 404 downwardly to the horizontal bar 402. In one embodiment, when the needle 414 appears in the first or left 412A portion of the upper arc 412, the current speed of the coating pass is deemed "too slow" as compared to a preferred or optimal speed. When the needle 414 appears in the second or right 412B portion of the upper arc 412, the current speed of the coating pass is deemed "too fast" as compared to the preferred or the optimal speed. When the needle 414 appears to align with the vertical bar 404, the current speed of the coating pass is deemed to fall at or within an acceptable range of the preferred or optimal speed. As can be appreciated, the left 412A and right 412B portions of the upper arc 412 present degrees or ranges of sensed, tracked and/or determined values of speed being either "too slow" or "too fast", respectively. For example, less acceptable speeds appear closer to the horizontal bar 402 within the arc 412, and closer to preferred speeds appear closer to the vertical bar 404.

Also as shown in FIG. 14, the E-Orb 400 includes a center orb or sphere 430 to visualize the angular 424 and the distance 426 components of movement of the controller 60 relative to the work piece 30. In one embodiment, the center sphere 430 includes a horizontal bar or axis 432 and a vertical bar or axis 434 appearing, in one embodiment, as a second set of "crosshairs" or a sight used in "targeting." As the angular orientation of the controller 60 is altered, the angular orientation of the center sphere 430 relative to the horizontal bar 402 and the vertical bar 404 of the E-Orb 400 is similarly altered. As can be appreciated, a preferred or guideline angle or orientation of the controller 60 relative to the work piece 30 is achieved when the horizontal and vertical bars 432 and 434, respectively, of the center sphere 430 are aligned with the horizontal and vertical bars 402 and 404, respectively, of the E-Orb 400. In one embodiment, the horizontal bars 402 and 432 of the E-Orb 400 and the center sphere 430, respectively, appear as dashed lines to provide a visual distinction from the vertical bars 404 and 434, respectively.

In one embodiment, as the proximity or distance of the controller 60 to the work piece 30 is altered, the center sphere 430 either grows (e.g., indicating a distance is "too close") or shrinks (indicating a distance is "too far") in size (e.g., diameter) to visually represent distance. In one embodiment, as the center sphere 430 grows toward the outer ring 406, the controller 60 is moving closer to the work piece 30. Similarly, as the center sphere 430 grows or shrinks toward the inner ring 408, the controller 60 is moving further from the work piece 30. Accordingly, a preferred or guideline distance or proximity of the controller 60 relative to the work piece 30 is achieved when the size of the center sphere 430 is between the outer ring 406 and the inner ring 408. In one embodiment, the E-Orb 400 includes a third ring (not shown) located between the outer ring 406 and the inner ring 408 to depict the preferred distance. In another embodiment, a pair of pointers or indicators 438 may also represent proximity or distance between the controller 60 and the work piece 30. As the actual distance moves toward the preferred distance, the indicators 438 align.

Figure 5:
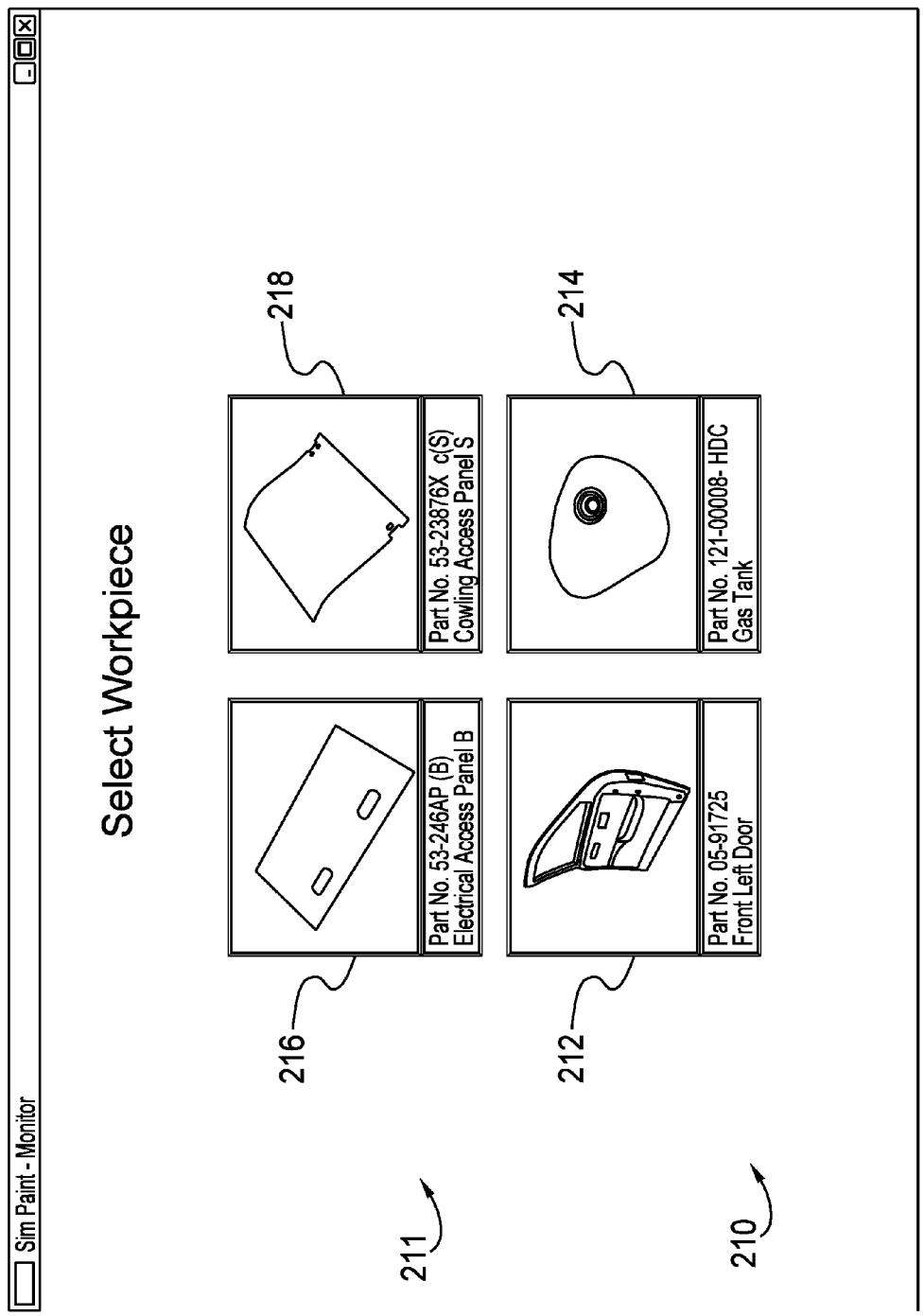
FIGS. 5-12 are exemplary graphical user interfaces depicting an application of a coating with the coating simulator of FIG. 1, according to one embodiment of the present invention.
Figure 6:
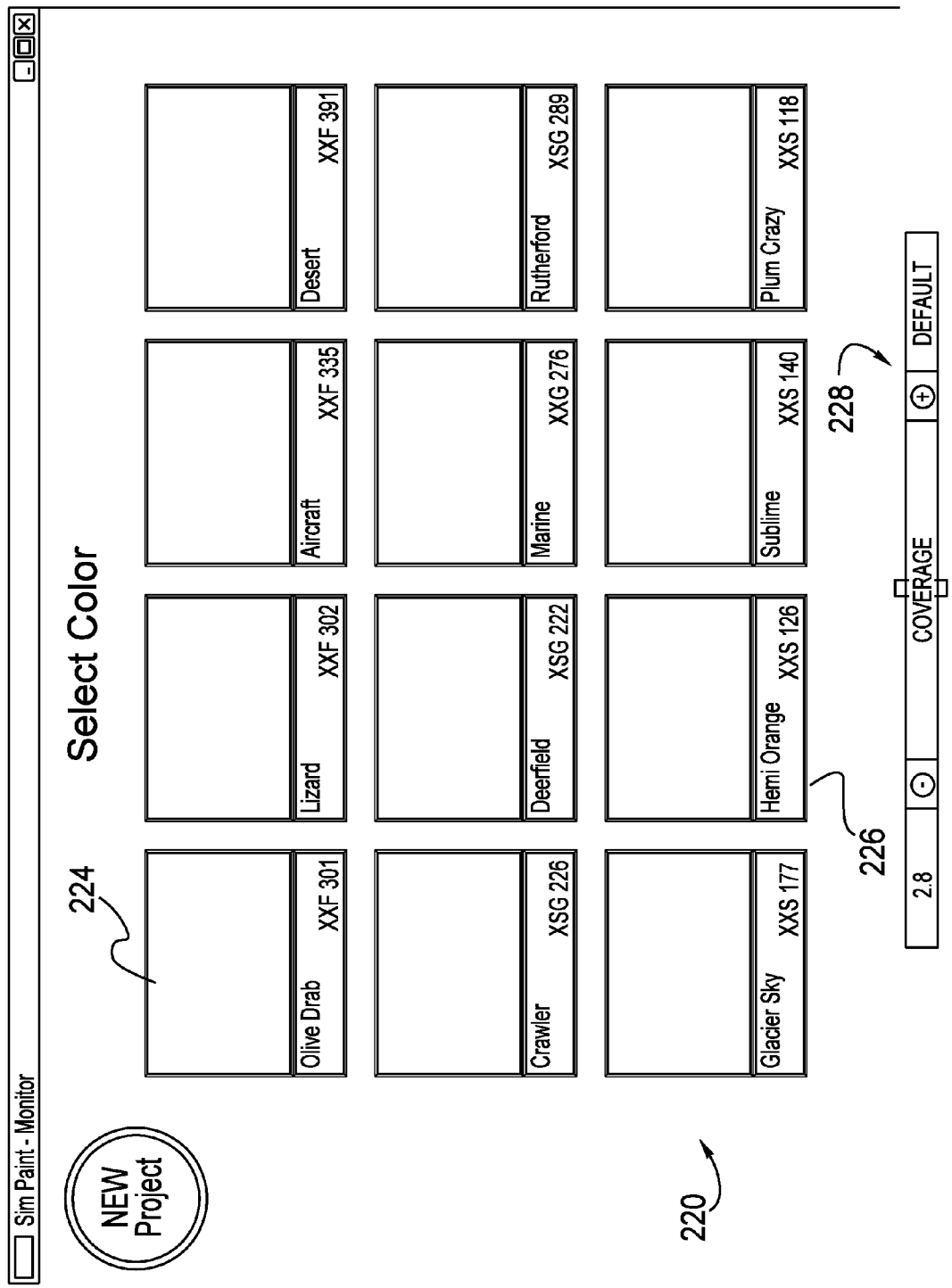

FIGS. 5-12 depict a plurality of graphical user interfaces (GUI) 200 of the coating simulator 20 that may be presented on one or both of the display device 56 coupled to the computing device 52 and/or the display 46 of the HMDU 40. In FIG. 5, a GUI 210 prompts the operator 10 to initiate the training session by selecting a work piece from a plurality of predefined work pieces 211. For example, GUI 210 presents a door 212, a gas tank 214, an electrical access panel 216 and a cowling access panel 218 as work pieces from the plurality of predefined work pieces 211 modeled by the coating simulator 20. In one embodiment, models of other work pieces may be imported into the coating simulator 20 such that specific materials, configurations (e.g., parts) of interest, for example, to a particular company are available for training and practice procedures. As shown in FIG. 6, a GUI 220 prompts the operator 10 to select certain coating set-up parameters such as a finish type, finish coating color 224, 226, target coverage thickness 228 (e.g., a 1 mil. to 20 mil.), and surface/material type. In one embodiment, the simulator 20 incorporates a large variety of colors and types of coatings as well as sheens and/or textures (e.g., flat, semi-gloss, and the like). While not shown, it should be appreciated that one or more additional ones of the GUIs 200 prompt the operator to select settings for equipment used in the coating application, for example, setting of the spray gun controller 60 and/or a compressor and the like. For example, the operator selects settings such as, for example, spray gun type, fan size, air pressure and flow rate. The selected settings are provide to and recorded by the data processing system 50 such that the operator's choice or selection may be captured and evaluated within an evaluation of his/her overall performance of a particular coating procedures, for example, from setup, startup of equipment, through use of equipment in application of a coating, to completion and shutdown of equipment, and cleanup.

Figure 7:
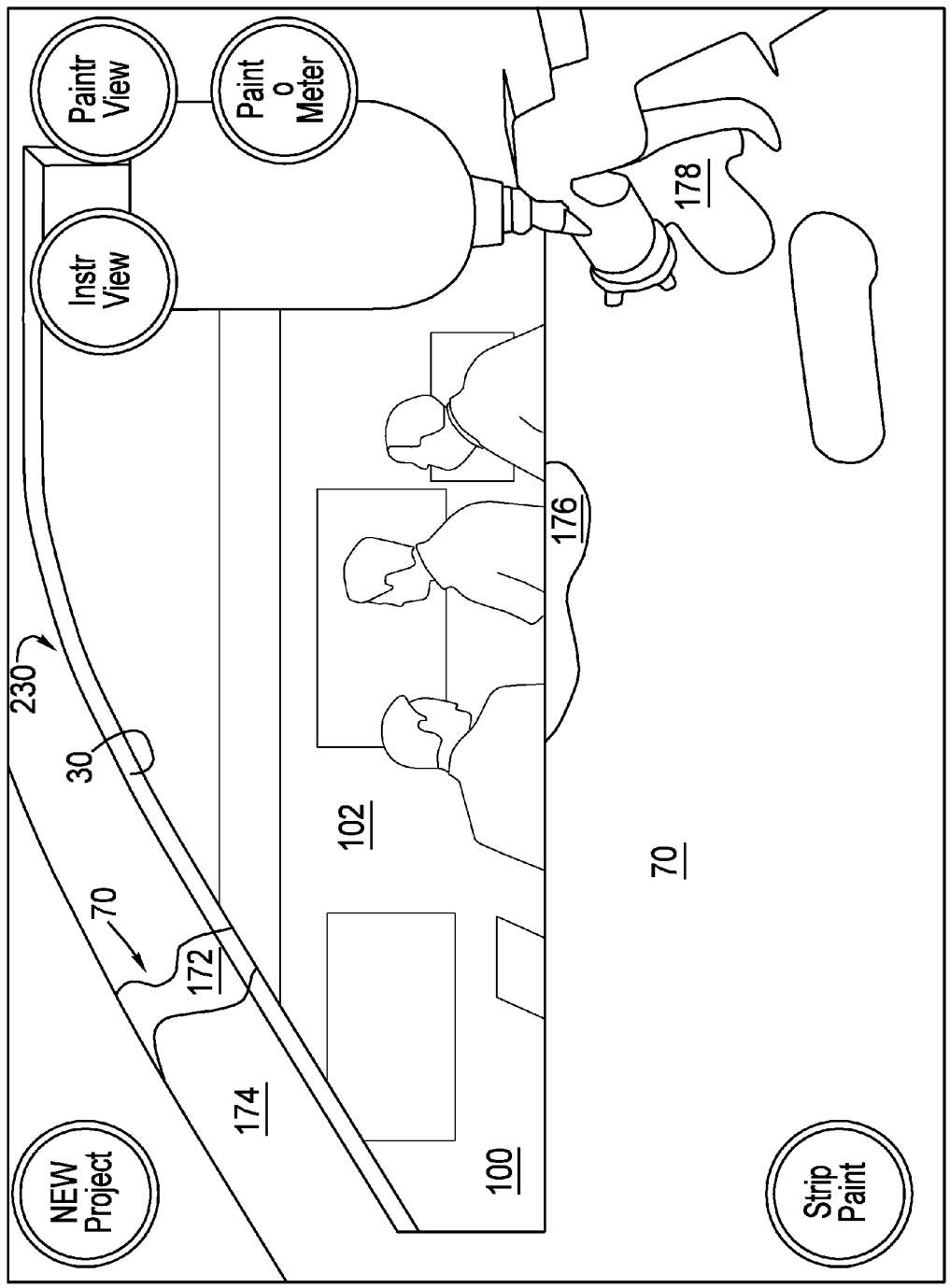
Figure 8:
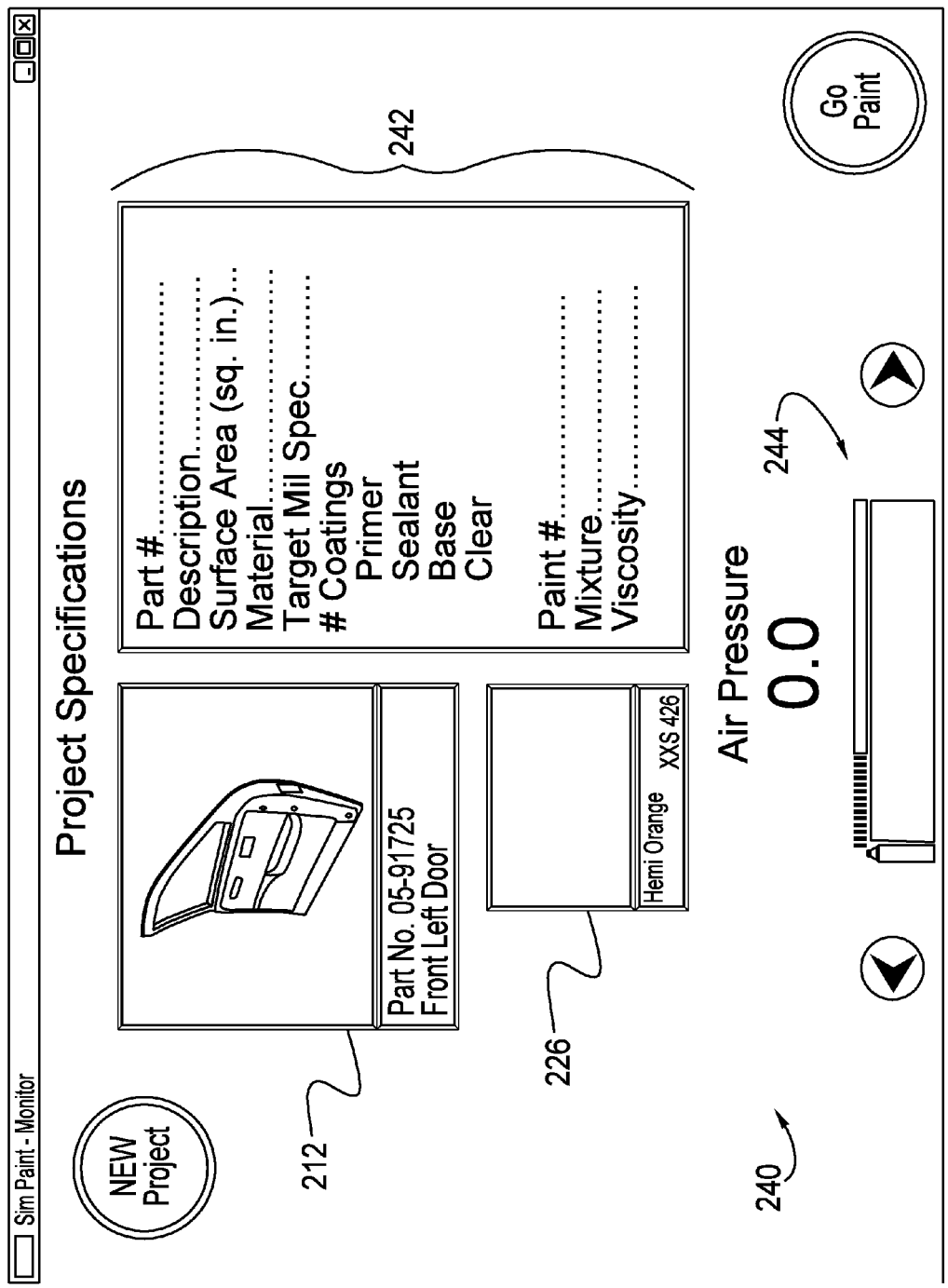

FIG. 7 depicts the 3-D spray coating environment 100 on a GUI 230. For example, the GUI 230 depicts a rendering of the work piece 30 in a real-world setting 102. As shown in FIG. 7, the controller 60 is rendered and depicts application of the virtual coating 70 on the work piece 30, e.g., a door. The door 30 has been virtually painted using the finish coating color 226 selected on the GUI 220 (FIG. 6). It should be appreciated one or more regions of coverage 172, 174, 176 and 178 are depicted in the GUI 230 representing one or more thicknesses or accumulation of the coating 70. In FIG. 8, a GUI 240 presents a coating project specification summary 242 to the operator and/or a trainer, teacher, evaluator or instructor. As shown in FIG. 8, the summary 242 highlights the operators choice of a part (e.g., part 212) and one or more coating (e.g., a coating 226) to be applied to the part during a spray coating application procedure using the coating simulator 20. The summary 242 further documents parameters set by the operator 10 such as, for example, air pressure 244, provided by a compressor to the controller 60.

Figure 9:
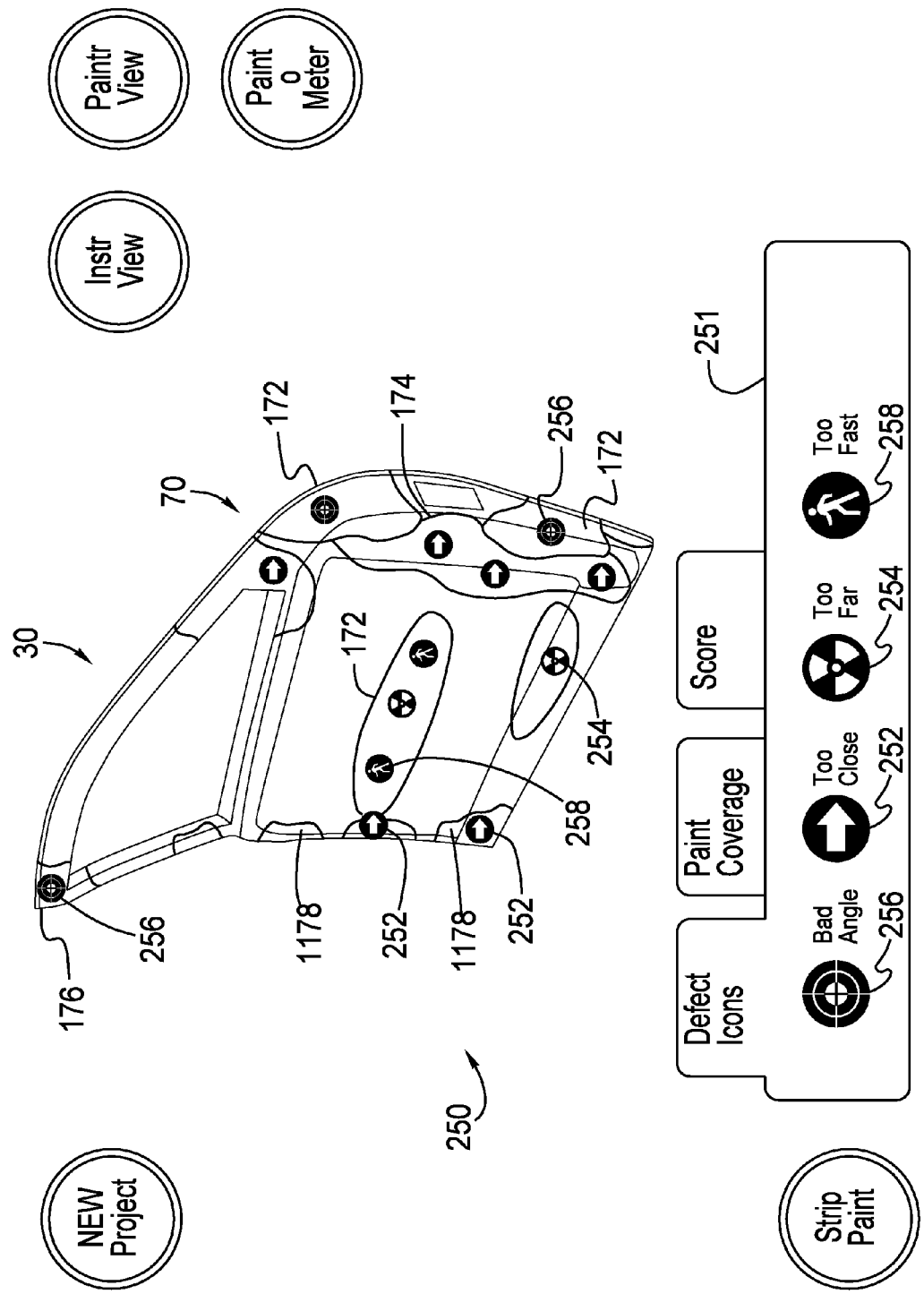

As shown in FIGS. 9-10, 11A, 11B and 16A-16B, GUIs 250, 260, 270, 280 and 500, respectively, depict one or more performance, evaluation and instructional views provided by the simulator 20 of a spray coating application procedure. For example, as shown in FIG. 9, the GUI 250 depicts the work piece 30 (e.g., the door 212), the virtual coating 70 applied to the work piece 30 and the coverage regions 172, 174, 176 and 178 as well as real-time sensory instruction and/or guidance, for example, icons 252, 254, 256, 258 that highlight various characteristics (e.g., defects) of the application procedure. For example, the GUI 250 represents a Defect mode which illustrates one or more defects symbols or icons, depicted in Defect Icons legend 251, as well as improper coverage overlap between the regions 172, 174, 176 and 178. In one embodiment, the icons include a "Too Close" indication 252 (e.g., a sensory indication that the spray controller 60 was held too close to the work piece 30 during a portion of the application procedure), a "Too Far" indication 254 (e.g., a sensory indication that the spray controller 60 was held too far from the work piece 30 during a portion of the application procedure), a "Bad Angle" indication 256 (e.g., a sensory indication that the spray controller 60 was held at an angle that is less than optimal for application of the subject coating), and a "Too Fast" indication 258 (e.g., a sensory indication that the spray controller 60 was moved too quickly across the portion of the work piece 30 such that less than optimal coverage was achieved). It should be appreciated that the present invention is not limited in this regard and that it is within the scope of the present invention to employ other display other icons highlighting same or different defects. In one embodiment, one of the icons 252, 254, 256, 258 in a specific area of coverage may be selected and, in response, the simulator 20 enlarges the area so that the selected defect can be examined and evaluated more closely by the operator 10 and/or instructor or certification agent 12.

Figure 16A:
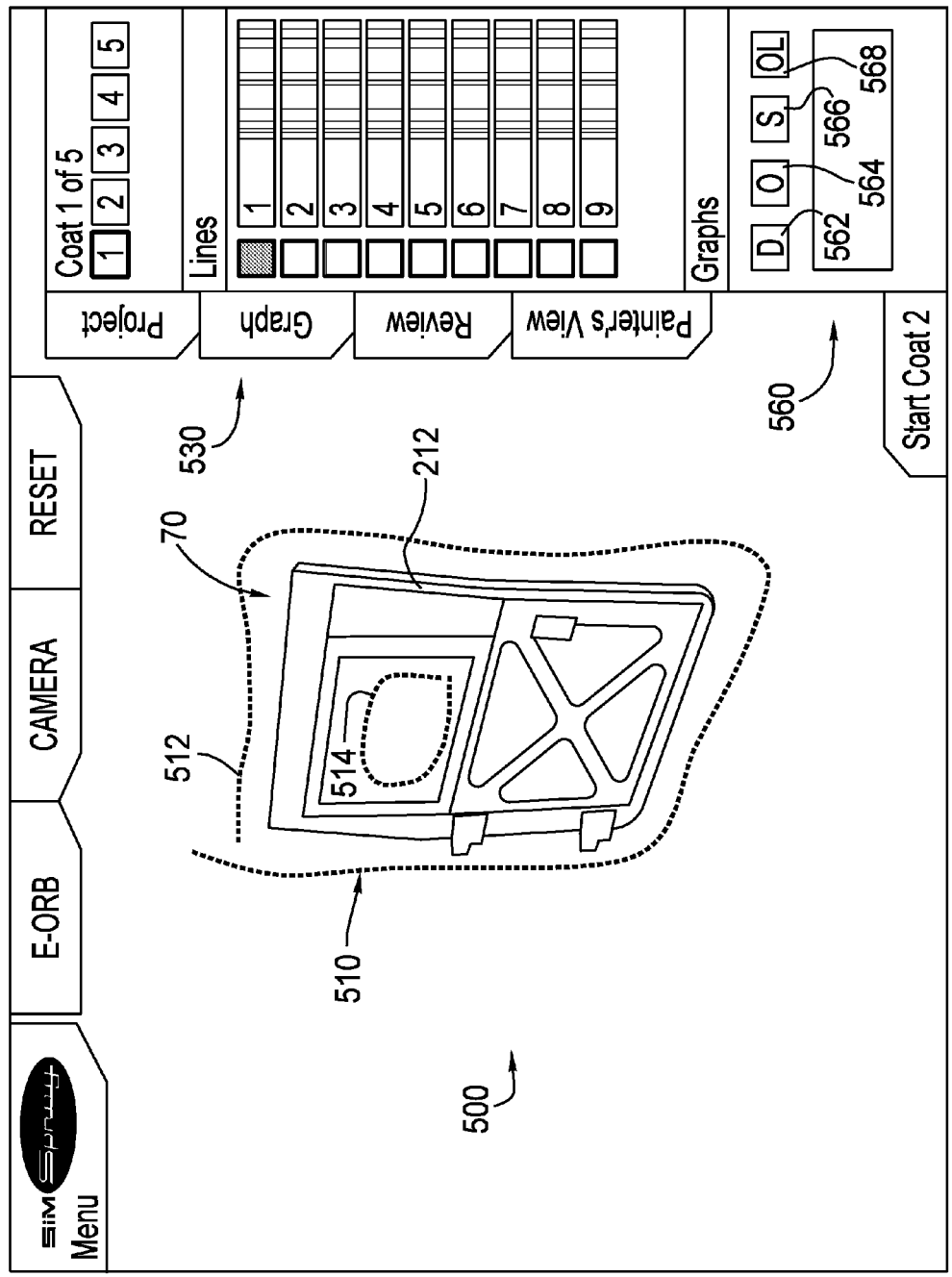
FIGS. 16A and 16B are exemplary graphical user interfaces depicting one or more paths of the spray controller of the coating simulator of FIG. 1 taken during a spray coating process, according to one embodiment of the present invention.
Figure 16B:
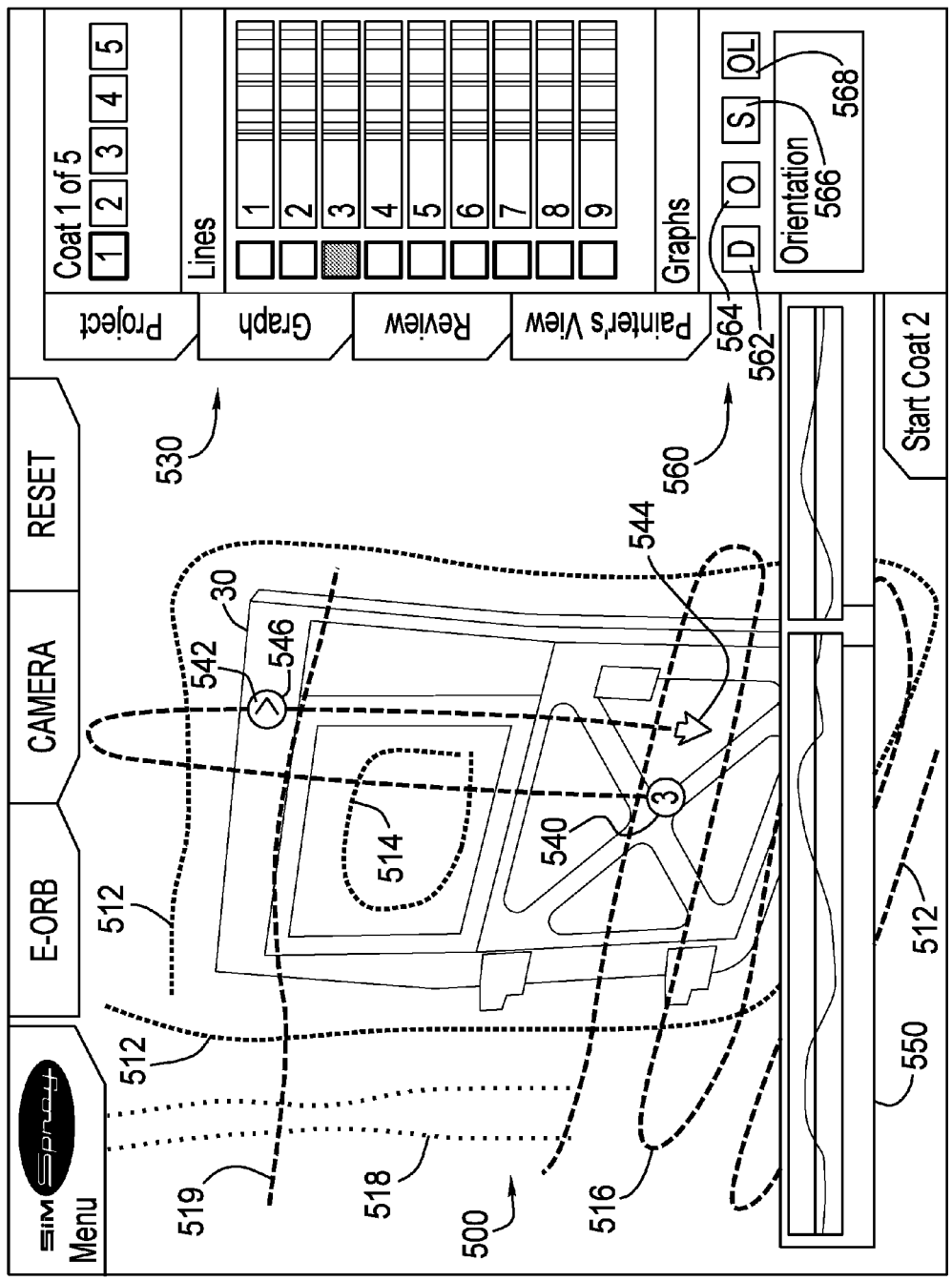

As shown in FIGS. 16A and 16B, the GUI 500 depicts the work piece 30 (e.g., the door 212), the virtual coating 70 applied to the work piece 30 and one or more paths or lines 510 (e.g., two paths shown) of the controller 60 during a coating pass. As noted above, the simulator 20 senses and tracks the movement of the controller 60 during a coating pass. In one embodiment, the path or line 510 is generated based upon the real-time position and orientation data collected by the simulator 20 (sensed, tracked and/or determined) detailing the movement of the controller 60. In one embodiment, a new one of the lines 510 is formed when the operator 10 depresses (e.g., completely or incrementally) the trigger 63 of the controller 60 indicating the beginning of a coating pass and the line ends when the operator releases (e.g., completely or incrementally) the trigger 63. If the operator 10 holds the trigger 63 at one position for a time period during a pass that exceeds a predetermined threshold, which is common in more experienced operators, the simulator 20 divides the resulting line based upon, for example, a sensed or tracked change in direction of the controller 60. As shown in FIG. 16A, two lines 512 and 514 are formed from one or more coating passes. As shown in FIG. 16B, five lines 512, 514, 516, 518 and 520 are formed from one or more coating passes. As depicted in FIG. 16B, the GUI 500 provides a 3-D representation of the coating passes and lines 510 such that the lines 512, 514, 516, 518, 519 and 520 are rendered in, for example, a layered or tiered effect. The layered or tiered effect provides a representation of coating layers. For example, a first pass (FIG. 16A) is made and generates the lines 512 and 514. A second pass is performed and generates the line 516, which is layered above the line 512. A third pass generates line 518, which is layered above the line 512. A fourth pass generates a line 519, which is layered above the line 512 and the line 518. A fifth pass generates a line 520, which is layered above the lines 512, 514, 516 and 519. In one embodiment, one or more of the lines 510 is color coded or otherwise made visually distinct. As shown in FIGS. 16A and 16B, a legend 530 depicts the various coding used to individually identify the lines 510.

In one embodiment, the lines 510 may includes one or more visual cues illustrating aspects of the controller's path such as, for example, speed, direction, orientation, and the like. For example, as shown in FIG. 16B, a starting point of one or more of the lines 510 (e.g., line 520) is indicated by a ball or sphere icon 540, which may also include an alphanumeric indication of the pass, and a cone or arrow 544 depicts direction and/or an end point of the line 520. A change in speed and/or orientation of the controller 60 during a pass may be depicted on the lines 520 by a second ball or sphere icon 546. In one embodiment, the icon 546 includes a specific indication of orientation of the controller such as, for example, an arrow or cone 542 within the icon 546. In one embodiment, the combined cone 542 and icon 546 being referred to as a Go-Cone. As can be appreciated, the Go-Cone may be repeated altered and refreshed as the controller 60 proceeds along its path (e.g., the line 520).

In one embodiment, the operator 10 and/or instructor 12 may select one of the lines 510. Once selected, characteristics of the line are illustrated. For example, one of a plurality of graphs (e.g., a graph 550) is rendered illustrating one or more aspects of the controller's path such as, for example, speed, direction, orientation, and the like, in the represented pass. In one embodiment, an information tab portion 560 of the GUI 500 allows selection from the plurality of graphs, for example, a D icon 562 invoking depiction of a distance graph, an O icon 564 invoking depiction of the orientation graph 550, a S icon 566 invoking depiction of a speed graph and an OL icon 568 invoking depiction of an overlay or coverage graph.

As should be appreciated, it is within the scope of the present invention to provide more (e.g., the aforementioned distance gauge 290 (FIG. 12) and E-Orb 400 (FIG. 14)) and/or different sensory indications (e.g., visual graphs and icons, audio and/or tactile indications) to illustrate, for example, both favorable and/or unfavorable aspects of the virtual coating application process being performed. It should also be appreciated that one or more of the sensory indications (e.g., the Defect icons 252, 254, 256, and 258, distance gauge 290, E-Orb 400, lines 510, and other indications) are presented as the application procedure is being performed, for example, as the virtual coating 70 is being applied to the work piece 30 such that the operator 10 receives real-time feedback on his/her performance, as well as the aforementioned evaluation and/or review modes. The inventors have discovered that this in-process, real-time sensory guidance (e.g., the visual, audio and/or tactile indications) can improve training of the operator 10 by influencing and/or encouraging in-process changes by the operator 10 such as positioning (e.g., proximity and/or angle) of the controller 60 in relation to the work piece 30. As can be appreciated, repeated performance at, or within a predetermined range of, optimal performance characteristics develops and/or reinforces skills necessary for performing a skill-oriented task. Accordingly, the simulator 20 and its real-time evaluation and sensory guidance toward optimal performance characteristics are seen as advantages over conventional training techniques.

Figure 10:
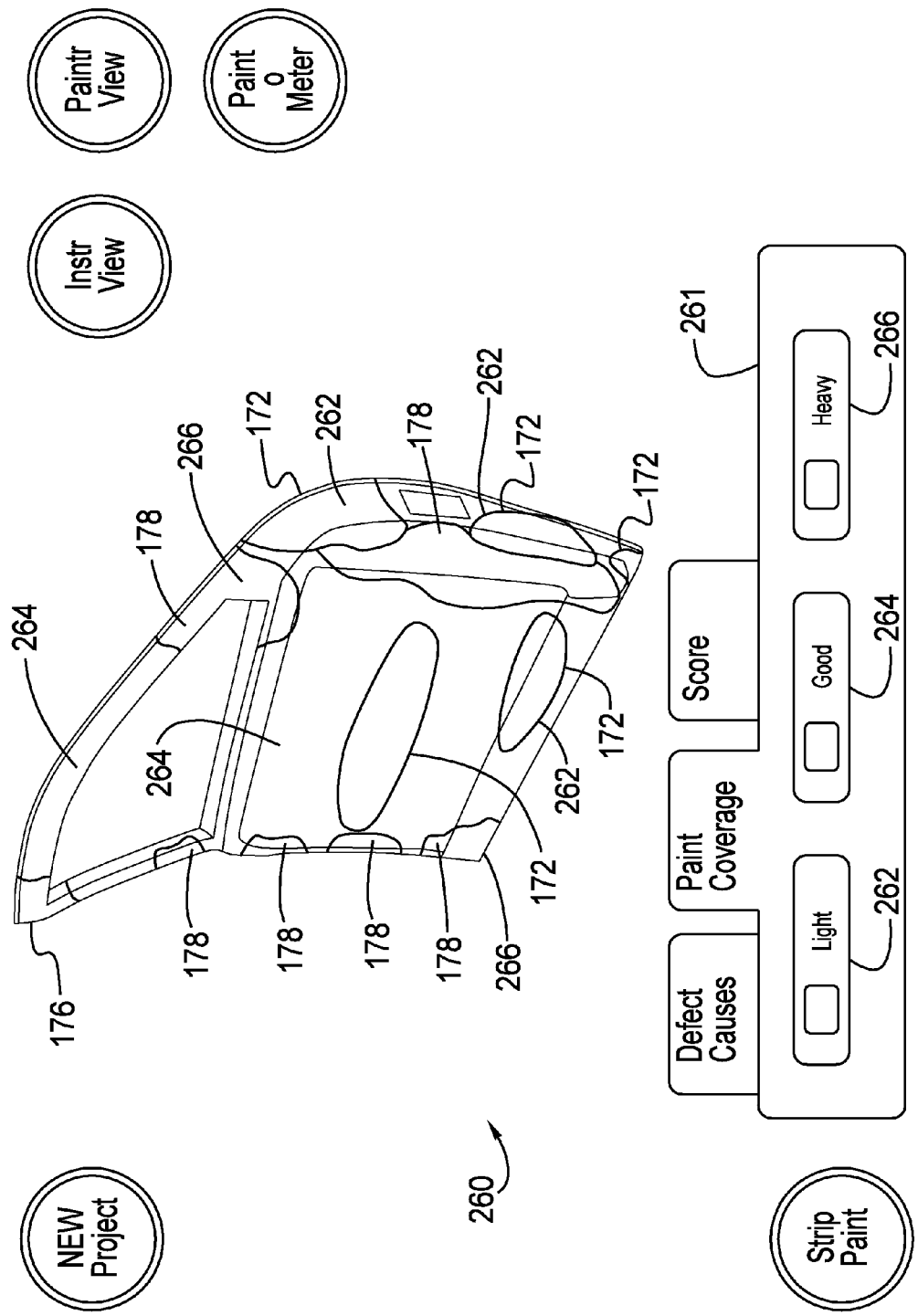
Figure 11A:
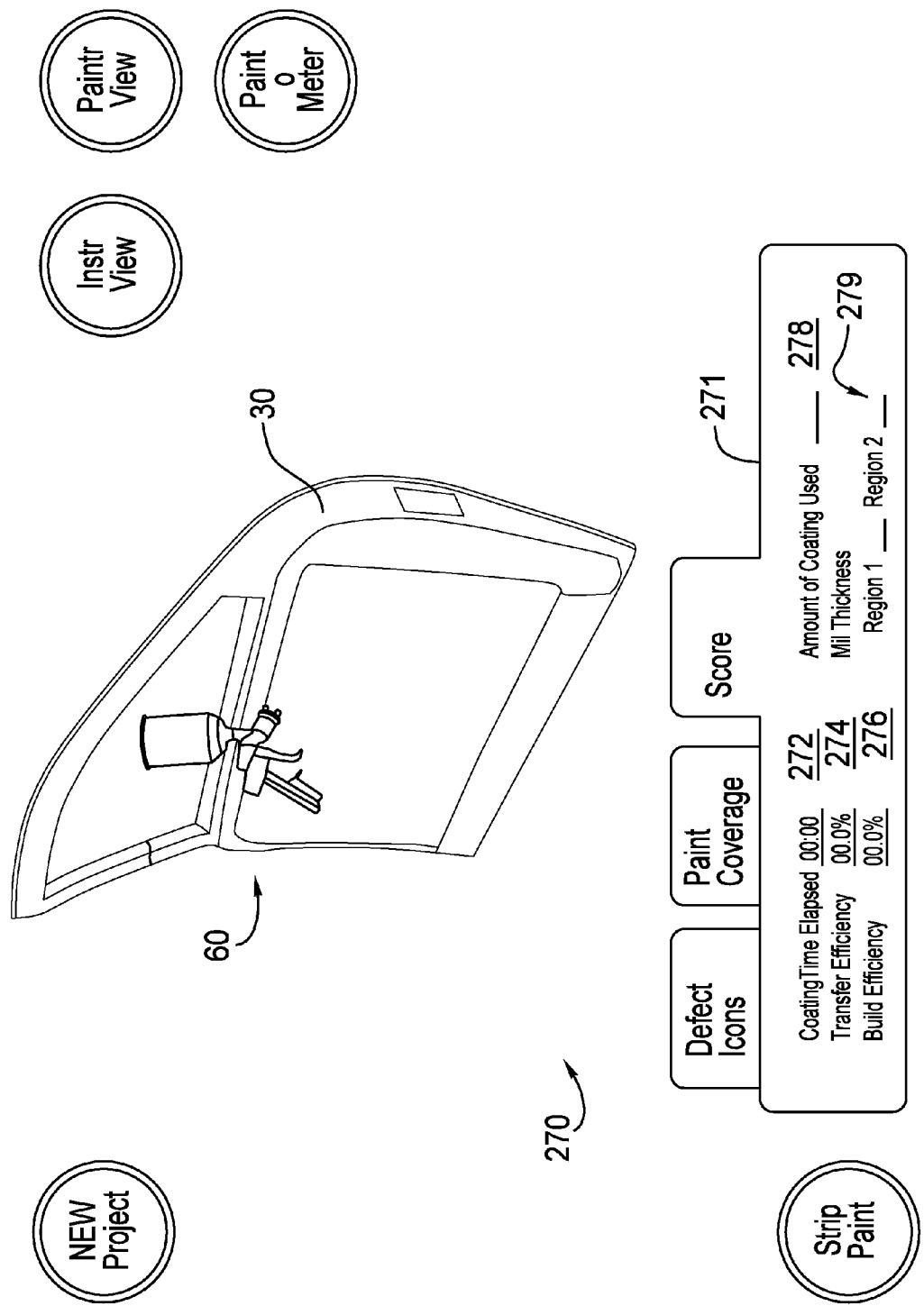
Figure 11B:

In FIG. 10, the GUI 260 depicts the coverage regions 172, 174, 176, and 178 and their boundaries by visually indicating a color coding scheme. The color code scheme, as indicated in Paint Coverage legend 261, highlights areas/regions where the coating was applied in a particular manner, e.g., "light" 262, "good" 264, and "heavy" 266. In FIG. 11A, the GUI 270 presents performance data to the operator 10 and/or instructor 12. The performance data collected and presented at a Score legend 271 includes, for example, Coating Time Elapsed 272, Transfer Efficiency 274, Build Efficiency 276, Amount of Coating Used 278 and approximate Mil Thickness 279 thus providing the operator 10 and/or instructor 12 with feedback as to the operator's performance. In one embodiment, the depiction of the work piece 30 may illustrate one or more of the performance parameters with color, shading, icons or the like. Additionally, the GUI 270 may selectively compare the performance of a current session/application procedure to one or more previous sessions to measure a positive or a negative trend in performance at or toward optimal and/or satisfactory ranges. In FIG. 11B, the GUI 280 provides summary information 282 that highlights performance characteristics as well as factors that may be used in, for example, a return on investment (ROI) determination demonstrating cost benefits achieved by using the inventive simulator 20 for skill-oriented training. In one embodiment, one or more of the GUIs 250, 260 and 270 may include features and functions for the instructor 12 to highlight and discuss one or more of the performance measurements on the work piece 30 during or after a session/application procedure to even further facilitate learning.

It should be appreciated that, as illustrated in FIGS. 11A and 11B, the coating simulator 20 automatically analyze the sensed and tracked data and information to determine performance characteristics of the operator 10 performing the virtual coating process, as well as quality characteristics of the virtual coating produced by the virtual coating process. For example, the coating simulator 20 may analyze and score the performance characteristics of the operator 10 and the quality characteristics of the virtual coating 70. Exemplary performance characteristics of the operator 10 may include, but are not limited to, a coating trajectory (e.g., angle), a speed of the spray controller 60, pitch and roll angles of the spray controller 60 (e.g., orientation), and elapsed time of the coating process. The quality characteristics of a coating produced by the virtual coating process may include, for example, a depth of coverage as well as discontinuities, defects, and flaws within certain regions of a coating produced by the virtual coating process. Furthermore, in some embodiments, the performance characteristics associated with the operator 10 and/or the quality characteristics associated with a virtual coating 70 may be used to provide a measure or score of a capability of the operator 10, where a numeric score is provided based on how close to optimum (e.g., preferred, guideline, or ideal) the operator 10 is for a particular tracked parameter, and depending on a determined level of defects, or other parameters associated with the virtual coating.

As described above, the simulator 20 tracks, records and utilizes various cues and sensory indications to exhibit both favorable and/or unfavorable aspects of the virtual coating application process being performed by the operator 10. In one aspect of the invention, the simulator 20 evaluates operator performance (e.g., equipment settings, controller movement (e.g., speed, direction or path, orientation, distance), and the like) to a set of performance criteria established by, for example, the instructor or certification agent 12 and/or industry standards of acceptability. In one embodiment, the simulator 20 based evaluation yields scores and/or rewards (e.g., certification levels, achievement badges, and the like) highlighting the operator's results as compared to the set of performance criteria and, in one embodiment, as compared to other trainees. The scoring may be determined and/or presented both on a pass-by-pass basis, and on a completed task basis. As noted above, the scoring may include evaluations of controller movement (e.g., speed, orientation, distance) and other coating parameters such as elapsed time, transfer efficiency, application efficiency (e.g., material and emissions savings), trigger presses versus timing, and coverage (e.g., perceived good and bad coverage). In one embodiment, the scoring and/or rewards are stored in the simulator 20, for example, within the aforementioned scores and performance criterion 144 of the data store 140 for one or more trainee/operators 10. In one embodiment, the scoring and/or rewards may be downloaded and transferred out of the simulator 20 such as, for example, via a UBS port on the computing device 52. In one embodiment, scoring and/or rewards for one or more trainees (e.g., the operators 10) may be shared electronically, for example, included in electronic mail messages, posted on company and/or industry websites and bulletin boards, and over social media sites. In one embodiment, one or more of the operators 10 may provide records of scores and/or achieved levels of skill and/or certification as, for example, a portfolio 146 of certifications and/or sample performances that can be viewed and evaluated by potential employers and the like.

Figure 17A:
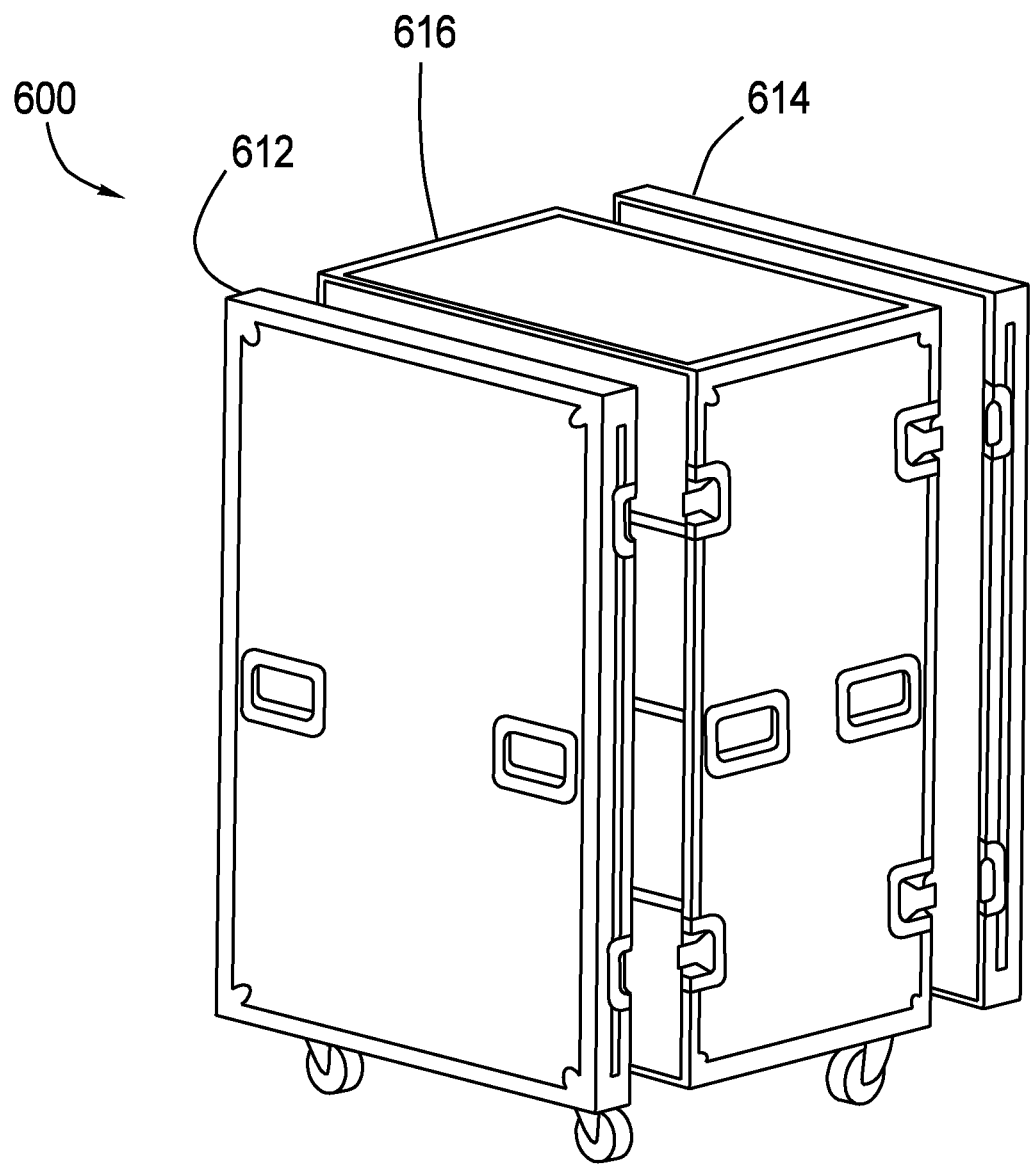
FIGS. 17A and 17B depict a portability feature of the coating simulator of FIG. 1, according to one embodiment of the present invention.
Figure 17B:
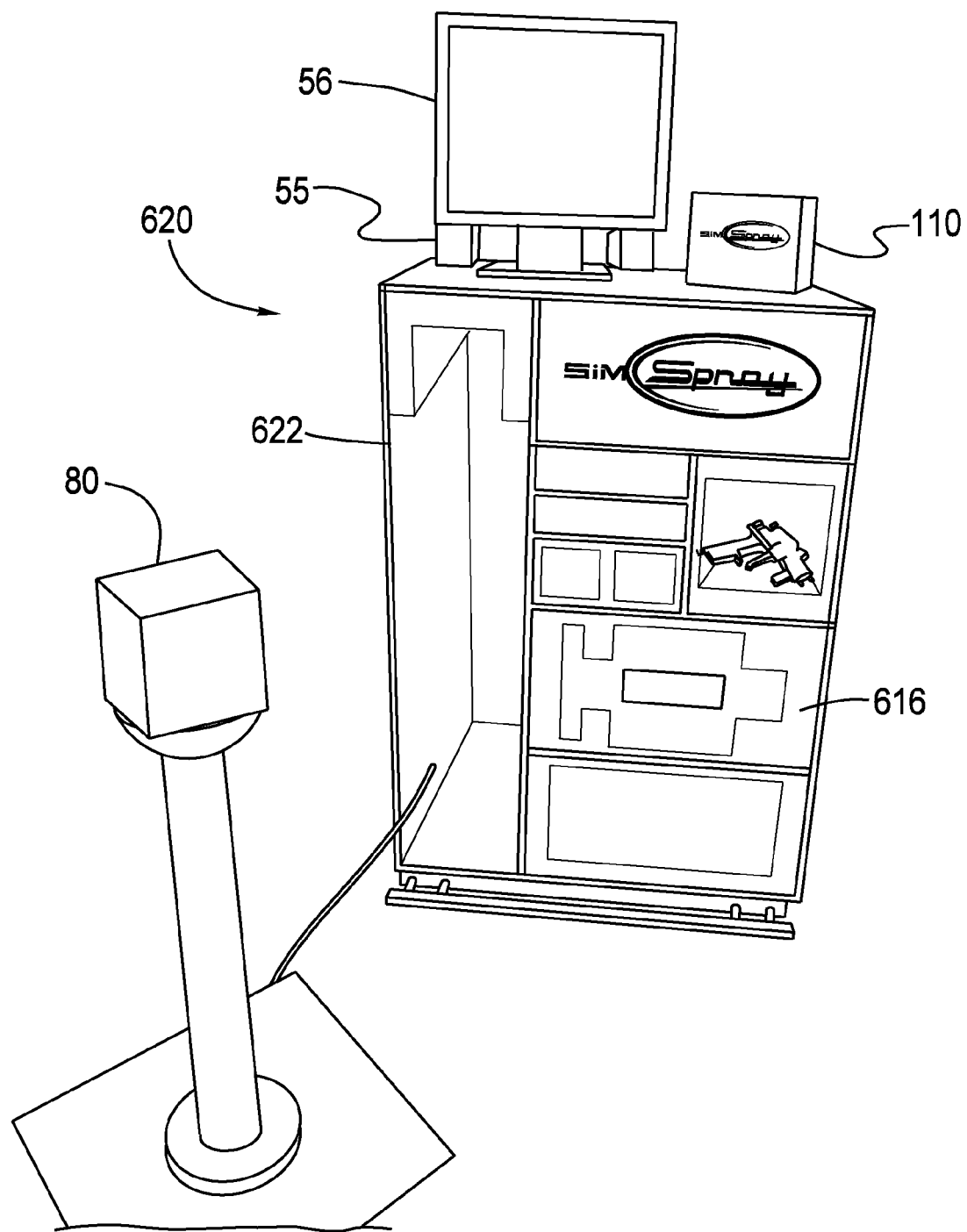

In one aspect of the present invention, illustrated in FIGS. 17A and 17B, the simulator 20 is portable (e.g., transferable) as a self-contained modular assembly 600. The modular assembly 600 includes case or trunk 610 having a removable front panel 612 and a removable rear panel 614 selectively coupled to a central cabinet 616 (FIG. 17A). Once the panels 612 and 614 are removed, one or more interior chambers or compartments 620 within an interior of the central cabinet 616 are revealed (FIG. 17B). As illustrated in FIG. 17B, components of the simulator 20 may be stored within the compartments 620 for storage and/or transportation. For example, the work piece platform 80 is stored in compartment 622. Similarly, external devices such as the speakers 55 and the display 56 are also stored within the compartments 620.

In one aspect of the invention, the portability of the simulator 20 supports training outside a formal training environment. For example, the operators 10 may initially utilize the simulator 20 at home or at their workplace without supervision by the instructor 12 as a mechanism for early exposure to the skills needed to successful perform at acceptable levels. Once the operator 12 achieves a basic understanding of the skills, training with the instructor 12 can focus upon the operator's demonstrated weaknesses while only reinforcing demonstrated strengths. This focused and/or targeted training is seen as an advantage provided by the simulator 20 as it concentrates instruction upon demonstrated strengths and weaknesses to maximize instructor-student interaction. As can be appreciated the demonstrated strengths and weaknesses can be shown to the instructor at an individual trainee level as well as a team or class of trainees level. In addition to use as an initial introduction to skills, the portability provides an ability for an operator having continued deficiencies in one or more skills to take the simulator 20 away from the training environment (e.g., to his/her home or work place) and focus upon specific areas of concerns outside the scheduled training time.

Some perceived benefits of the simulator 20 include, for example:

1. Innovation—provide a boost to training programs by utilizing a state-of-the-art tool.
   a. Breakthrough virtual and augmented reality technology are used to simulate real spraying coating processes.
   b. Real spray gun and peripheral equipment provide the look and feel of spray coating operations.
   c. No spray booth is required
   d. The simulator and training equipment is portable for easy setup in any classroom environment.
   e. The simulator and training equipment is cost effective.
2. Education—Increase valuable hands-on training.
   a. Instructors:
      (1) Set the specific part, paint and coating requirements.
      (2) Immediately evaluate the spray gun's position, distance, and speed to pinpoint errors in technique.
      (3) Rotate and inspect the virtual work-piece for paint coverage and consistency.
      (4) See savings and return on investment figures in a Paintometer™ graphical user interface.
   b. Students:
      (1) Toggle real time motion tracking cues to learn proper spray painting techniques.
      (2) Discover what techniques can produce defects.
      (3) Learn in a safe environment without potentially hazardous fumes and chemicals.
      (4) Practice more, in less time as set-up and clean-up is substantially minimized
3. Conservation—Reduce the carbon footprint of the training.
   a. Environmentally friendly:
      (1) Minimize over spray.
      (2) Decrease need for rework.

(3) Limit release of hazardous volatile organic compounds (VOCs).
b. Save Cost of:
(1) Materials—parts, paint, thinner, air filters, and cleaning supplies.
(2) Energy consumption.
(3) Hazardous material disposal fees.

While the invention has been described with reference to various exemplary embodiments, it will be understood by those skilled in the art that various changes may be made and equivalents may be substituted for elements thereof without departing from the scope of the invention. For example, while described above as a spray coating simulator that simulates application of a coating to a work piece, in other applications the features and functions of the simulator may be implemented to train operators in, for example, any skill-oriented task such as ablation processes, sandblasting and other removal processes, welding, plumbing and other operations performed by skilled tradesmen. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A simulator for skill-oriented training of a task, the simulator comprising:
   a work piece platform having at least one platform sensor;
   a three-dimensional virtual training environment, the training environment depicting a work piece rendered on the work piece platform;
   a head-mounted display unit (HMDU) worn by an operator operating the simulator, the HMDU having at least one camera, at least one speaker and at least one HMDU sensor, the at least one camera and the at least one speaker providing visual and audio output to the operator depicting the virtual training environment;
   a controller operated by the operator, the controller having at least one controller sensor, the at least one controller sensor, the at least one HMDU sensor and the at least one platform sensor cooperating to output one or more signals representing spatial positioning, angular orientation and movement data of the controller relative to the work piece rendered on the work piece platform;
   a data processing system coupled to the work piece platform, the HMDU, and the controller, the data processing system receiving the one or more signals and executing a plurality of algorithms for rendering in real-time the work piece, a virtual coating spray pattern, a virtual coating as applied to the work piece during a spray coating process and sensory guidance as to performance to the person in the training environment, the algorithms including:
      a tracking engine that receives the one or more signals from the at least one controller sensor, the at least one HMDU sensor and the at least one platform sensor, the tracking engine determines coordinates of a next position, next orientation, and a speed of movement of the controller in relation to the work piece rendered on the work piece platform from a previous position and a previous orientation to the next position and the next orientation for one or more coating passes during the spray coating process;
      a physics engine coupled to the tracking engine, the physics engine models the spray coating process and determines the virtual coating spray pattern and the applied virtual coating from the coordinates within the training environment; and
      a rendering engine coupled to the physics engine, the rendering engine receives the modeled spray coat process and, in response thereto, renders the virtual coating spray pattern and the applied virtual coating in the training environment;
   the virtual coating spray pattern, the applied virtual coating and the sensory guidance are exhibited in near real-time to the operator within the training environment to provide in-process correction and reinforcement of preferred performance characteristics as the operator operates the controller;
   the sensory guidance includes visual indications of performance comprised of an emulation orb presented within the three-dimensional virtual training environment during the spray coating process, the emulation orb presenting current movement components of the controller relative to the work piece rendered on the work piece platform as compared to optimal values for each position and orientation within the one or more coating passes, the current movement components including a speed of the coating pass, orientation of the controller relative to the work piece, and proximity of the controller to the work piece.

2. The simulator of claim 1, wherein the sensory guidance exhibited to the operator include a plurality of visual, audio and tactile indications of performance.

3. The simulator of claim 2, wherein the visual indications of performance include a distance gauge presented within the virtual spray coating pattern, the distance gauge presenting a first color when the controller is operated too close in position to the work piece, a second color when the controller is operated at a optimal position to the work piece, and a third color when the controller is operated too far in position from the work piece.

4. The simulator of claim 1, wherein the speed of the coating pass is visually represented by the emulation orb as a speedometer having an arc representing values of speed and a needle representing a currently sensed value of speed.

5. The simulator of claim 1, wherein the emulation orb includes a first horizontal bar and a first vertical bar, and the orientation of the controller relative to the work piece is visually represented by a central orb having a second horizontal bar and a second vertical bar and the angular orientation of the controller is visually represented by the angular orientation of the second horizontal and vertical bars relative to the first horizontal and vertical bars.

6. The simulator of claim 1, wherein the emulation orb includes an outer ring and an inner ring, and the distance of the controller relative to the work piece is visually represented by a central orb with a diameter that grows in size toward the outer ring as the controller's distance is too close to the work piece and that shrinks in size toward the inner ring as the controller's distance is too far from the work piece.

7. The simulator of claim 2, wherein the applied virtual coating is depicted to include a plurality of coverage regions and the visual indications include one or more icons highlighting one or more of the plurality of coverage regions having less than optimal characteristics.

8. The simulator of claim 7, wherein the one or more icons include a Too Close indication icon, a Too Far indication icon, a Bad Angle indication icon and a Too Fast indication icon.

9. The simulator of claim 2, wherein the audio indications of performance include an audio tone output by the at least one speaker of the HMDU.

10. The simulator of claim 9, wherein the audio tone at least one of increases in volume and repeated pattern as the controller is positioned too close to the work piece, and decreases at least one of decreases in volume and repeated pattern as the controller is position too far from the work piece.

11. The simulator of claim 2, wherein the visual indications of performance include a plurality of lines, presented within the three-dimensional virtual training environment, the plurality of lines visually presenting paths of the controller during the one or more coating passes.

12. The simulator of claim 11, wherein the plurality of lines are presented in a layered effect representing successive applications of the virtual coating to the work piece such that a first line representing a first path is over layered by a second line representing a second path.

13. The simulator of claim 12, wherein the plurality of lines include one or more visual cues illustrating the controller's speed, direction and orientation along the path.

14. The simulator of claim 1, a display device operatively coupled to the data processing system such that an instructor may monitor the performance of the person operating the controller.

15. The simulator of claim 1, wherein the controller further includes one or more haptic devices that impart at least one of forces, vibrations and motion to the person operating the controller.

16. The simulator of claim 15, wherein the forces, vibrations and motions from the haptic devices simulate the emission of the virtual spray coating.

17. The simulator of claim 2, wherein the visual indications include a score of the operator in equipment settings and controller movement including speed, direction or path, orientation, and distance, as compared to a set of performance criteria to standards of acceptability.

18. The simulator of claim 17, wherein the score is a numeric score based on how close to optimum the operator's performance is to the set of performance criteria.

19. The simulator of claim 17, wherein the score further includes rewards including certification levels and achievement badges highlighting the operator's results as compared to the set of performance criteria and to other operators.

20. The simulator of claim 19, wherein the score and rewards for one or more operators are at least one of shared electronically, posted on a website or bulletin board, and over social media sites.

21. A simulator for skill-oriented training of a task, the simulator comprising:
a work piece platform having at least one platform sensor;
a three-dimensional virtual training environment, the training environment depicting a work piece rendered on the work piece platform;
a head-mounted display unit (HMDU) worn by an operator operating the simulator, the HMDU having at least one camera, at least one speaker and at least one HMDU sensor, the at least one camera and the at least one speaker providing visual and audio output to the operator depicting the virtual training environment;
a controller operated by the operator, the controller having at least one controller sensor, the at least one controller sensor, the at least one HMDU sensor and the at least one platform sensor cooperating to output one or more signals representing spatial positioning, angular orientation and movement data of the controller relative to the work piece rendered on the work piece platform;
a data processing system coupled to the work piece platform, the HMDU, and the controller, the data processing system receiving the one or more signals and executing a plurality of algorithms for rendering in real-time the work piece, a virtual coating spray pattern, a virtual coating as applied to the work piece during a spray coating process and sensory guidance as to performance to the person in the training environment, the algorithms including:
a tracking engine that receives the one or more signals from the at least one controller sensor, the at least one HMDU sensor and the at least one platform sensor, the tracking engine determines coordinates of a next position, next orientation, and a speed of movement of the controller in relation to the work piece rendered on the work piece platform from a previous position and a previous orientation to the next position and the next orientation for one or more coating passes during the spray coating process;
a physics engine coupled to the tracking engine, the physics engine models the spray coating process and determines the virtual coating spray pattern and the applied virtual coating from the coordinates within the training environment; and
a rendering engine coupled to the physics engine, the rendering engine receives the modeled spray coat process and, in response thereto, renders the virtual coating spray pattern and the applied virtual coating in the training environment;
the virtual coating spray pattern, the applied virtual coating and the sensory guidance are exhibited in near real-time to the operator within the training environment to provide in-process correction and reinforcement of preferred performance characteristics as the operator operates the controller;
the sensory guidance includes visual indications of performance presented within the three-dimensional virtual training environment during the spray coating process, the visual indications of performance presenting current movement components of the controller relative to the work piece rendered on the work piece platform as compared to optimal values for each position and orientation within the one or more coating passes, the current movement components including a speed of the coating pass, orientation of the controller relative to the work piece, and proximity of the controller to the work piece, the visual indications of performance further including a plurality of lines presented within the three-dimensional virtual training environment, the plurality of lines visually presenting paths of the controller during the one or more coating passes, wherein the plurality of lines include one or more visual cues illustrating the controller's speed, direction and orientation along the path.

* * * * *